US012626938B2

(12) United States Patent
Wu

(10) Patent No.: US 12,626,938 B2
(45) Date of Patent: May 12, 2026

(54) RANGE EXTENSION SYSTEM

(71) Applicant: Chen-Yang Wu, Taipei City (TW)

(72) Inventor: Chen-Yang Wu, Taipei City (TW)

(*) Notice: Subject to any disclaimer, the term of this patent is extended or adjusted under 35 U.S.C. 154(b) by 905 days.

(21) Appl. No.: 17/912,856

(22) PCT Filed: Mar. 19, 2021

(86) PCT No.: PCT/CN2021/081890
§ 371 (c)(1),
(2) Date: Mar. 29, 2023

(87) PCT Pub. No.: WO2021/185367
PCT Pub. Date: Sep. 23, 2021

(65) Prior Publication Data
US 2023/0231163 A1 Jul. 20, 2023

(30) Foreign Application Priority Data

Mar. 20, 2020 (CN) .......................... 202010204976.6

(51) Int. Cl.
*H01M 8/04* (2016.01)
*B60L 50/72* (2019.01)
(Continued)

(52) U.S. Cl.
CPC ......... *H01M 8/04201* (2013.01); *B60L 50/72* (2019.02); *B60L 58/30* (2019.02); (Continued)

(58) Field of Classification Search
CPC ......... B60L 50/70; B60L 50/62; B60L 50/72; B60L 58/30; H01M 8/04201; (Continued)

(56) References Cited

U.S. PATENT DOCUMENTS 7,690,453 B2 * 4/2010 Kinoshita ............... B60L 58/20
180/65.1
8,565,946 B2 * 10/2013 Cooper ............... B61L 15/0058
701/19
(Continued)

FOREIGN PATENT DOCUMENTS

CN 1661839 8/2005
CN 201845828 5/2011
(Continued)

OTHER PUBLICATIONS

"Office Action of Taiwan Counterpart Application", issued on Jan. 10, 2022, p. 1-p. 5.
(Continued)

*Primary Examiner* — Dapinder Singh
(74) *Attorney, Agent, or Firm* — JCIPRNET

(57) ABSTRACT

The invention provides a range extension system including a range extension assembly, a fuel supply unit, and a second fuel storage device. The range extension assembly has a first fuel input portion and a second fuel input portion. The first fuel input portion is configured to receive a first fuel source. The second fuel input portion is configured to receive a second fuel source different from the first fuel source. The second fuel source and the first fuel source are mixed in the range extension assembly to generate an electrical output. The fuel supply unit is configured to provide the first fuel source to the first fuel input portion. The second fuel storage device is configured to store and provide the second fuel source to the second fuel input portion.

38 Claims, 17 Drawing Sheets

(51) Int. Cl.
    *B60L 58/30*         (2019.01)
    *H01M 8/04082*    (2016.01)
    *H01M 8/04119*    (2016.01)
    *H01M 8/0438*     (2016.01)
    *H01M 8/04746*    (2016.01)

(52) U.S. Cl.
    CPC ... *H01M 8/04126* (2013.01); *H01M 8/04388*
        (2013.01); *H01M 8/04753* (2013.01); *H01M*
        *2250/20* (2013.01)

(58) Field of Classification Search
    CPC ......... H01M 8/04126; H01M 8/04388; H01M
        8/04753; H01M 8/04955; H01M 2250/20;
        Y02E 60/50; Y02T 10/62; Y02T 10/70;
        Y02T 90/40
    See application file for complete search history.

(56)             References Cited

U.S. PATENT DOCUMENTS

| | | | | |
|---|---|---|---|---|
| 9,193,254 | B2 * | 11/2015 | Li | B60L 3/0092 |
| 9,193,362 | B2 * | 11/2015 | Foege | B61C 17/02 |
| 10,214,201 | B1 | 2/2019 | Perez | |
| 11,845,475 | B1 * | 12/2023 | Claussen | B60L 50/61 |
| 2010/0186619 | A1 * | 7/2010 | Kumar | B60L 9/005 |
| | | | | 104/288 |
| 2014/0318410 | A1 * | 10/2014 | Kral | B61C 7/04 |
| | | | | 307/9.1 |
| 2017/0073026 | A1 * | 3/2017 | Mugele | B60P 1/00 |
| 2018/0366753 | A1 | 12/2018 | Okuyoshi et al. | |
| 2019/0351895 | A1 | 11/2019 | Ben-Ari | |

FOREIGN PATENT DOCUMENTS

| | | |
|---|---|---|
| CN | 102582454 | 7/2012 |
| CN | 105874637 | 8/2016 |
| CN | 106627210 | 5/2017 |
| CN | 108284752 | 7/2018 |
| CN | 109962265 | 7/2019 |
| CN | 110015211 | 7/2019 |
| CN | 110065398 | 7/2019 |
| CN | 110549876 | 12/2019 |
| CN | 110562057 | 12/2019 |
| CN | 110663131 | 1/2020 |
| CN | 112467173 | 3/2021 |
| IN | 1894815 | 1/2007 |
| JP | 2017157439 | 9/2017 |
| KR | 20130074338 | 7/2013 |
| KR | 101405651 | 6/2014 |
| TW | 201249062 | 12/2012 |
| WO | 2017147950 | 9/2017 |
| WO | 2020044966 | 3/2020 |

OTHER PUBLICATIONS

"International Search Report (Form PCT/ISA/210) of PCT/CN2021/081890," mailed on Apr. 27, 2021, pp. 1-5.

"Notice of allowance of China Counterpart Application", issued on Jun. 21, 2024, p. 1-p. 4.

"Office Action of China Counterpart Application", issued on Aug. 11, 2023, p. 1-p. 9.

\* cited by examiner

100A

61

62

60

100B

20

61

60

100C

20

78

61

60

RANGE EXTENSION SYSTEM

CROSS-REFERENCE TO RELATED APPLICATION

This is a 371 application of the International PCT application serial no. PCT/CN2021/081890, filed on Mar. 19, 2021, which claims the priority benefit of China Application No. 202010204976.6, filed on Mar. 20, 2020. The entirety of each of the above-mentioned patent applications is hereby incorporated by reference herein and made a part of this specification.

BACKGROUND OF THE INVENTION

Field of the Invention

The invention relates to a green energy technique, in particular to a range extension system suitable for a transport.

Description of Related Art

An electric vehicle refers to a vehicle that uses a power supply to supply power to an electric motor, and the electric motor converts electrical energy into kinetic energy to propel the vehicle. At present, the electric vehicle has a certain popularity in the market. The electric energy adopted by the electric vehicle may come from ordinary batteries, lithium batteries, solid-state batteries, NiMH batteries, or a composite power supply system integrating fuel cells with ordinary batteries, lithium batteries, solid-state batteries, and NiMH batteries, and the range extension system includes the above and other devices and equipment that may increase the mileage of the vehicle, and of course also includes an range extension method for charging the battery. The fuel cell produces electrical energy via a chemical reaction between hydrogen and oxygen, which is then transmitted to the motor of the car and converted into kinetic energy to propel the vehicle.

SUMMARY OF THE INVENTION

In a transport (such as a pure electric car or a hybrid electric car or an electric scooter) that adopts an range extension system (such as a fuel cell power supply) known to the inventor, the supply of the fuel source may not be adjusted in real time according to the driving condition of the user, thereby causing unnecessary consumption of fuel and electric energy.

The invention provides a range extension system including an range extension assembly, a fuel supply unit, and a second fuel storage device. The range extension assembly has a first fuel input portion and a second fuel input portion. The first fuel input portion is configured to receive a first fuel source. The second fuel input portion is configured to receive a second fuel source different from the first fuel source. The second fuel source and the first fuel source are mixed in the range extension assembly to generate an electrical output. The fuel supply unit is configured to provide the first fuel source to the first fuel input portion. The second fuel storage device is configured to store and provide the second fuel source to the second fuel input portion.

In summary, the range extension systems of one or a plurality of embodiments of the invention may receive the first fuel source and the second fuel source via the first fuel input portion and the second fuel input portion, respectively. In turn, the first fuel source and the second fuel source are mixed in the range extension assembly to generate electrical output. In addition, in some embodiments, the first fuel storage device and the second fuel storage device may be used as supply sources of the first fuel source and the second fuel source, respectively. In some embodiments, the first fuel source control device and/or the second fuel source control device may suitably adjust the supply amount of the fuel source in real time according to different driving conditions of the user. In some embodiments, in the range extension system, fuel may also be provided directly and continuously from a gas storage cylinder to the range extension assembly via a first fuel source auxiliary control device and/or a second fuel source auxiliary control device when the user determines via a central control unit that power is insufficient and fuel needs to be provided. In some embodiments, when the load of the transport is higher, the gas storage cylinder may additionally add fuel to the range extension assembly via a first pressure balance valve and/or a second pressure balance valve of the range extension system, thereby increasing the power output of the range extension assembly. In some embodiments, the first fuel source may be provided by being configured with a blower; alternatively, the first fuel source may be selectively obtained from one of the blower and the first fuel storage device configured.

BRIEF DESCRIPTION OF THE DRAWINGS

The accompanying drawings are included to further understand the invention, and the drawings are incorporated in the specification and constitute a part of the specification. The drawings illustrate embodiments of the invention and, together with the description, serve to explain principles of the invention.

DESCRIPTION OF THE EMBODIMENTS

Figure 1:
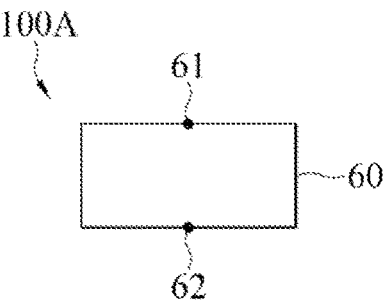
FIG. 1 shows a brief system block diagram of the range extension system of the first embodiment of the invention.

Hereinafter, reference will be made in detail to exemplary embodiments of the invention, and examples of the exemplary embodiments are illustrated in the figures. Wherever possible, the same reference numerals are used in the figures and the descriptions to refer to the same or similar portions.

FIG. 1 shows a brief system block diagram of a range extension system 100A of the first embodiment of the invention. As shown in FIG. 1, in the present embodiment, the range extension system 100A includes a range extension assembly 60. The range extension assembly 60 has a first fuel input portion 61 and a second fuel input portion 62. The first fuel input portion 61 is configured to receive a first fuel source, and the second fuel input portion 62 is configured to receive a second fuel source different from the first fuel source. The first fuel source and the second fuel source are mixed in the range extension assembly 60 to generate electrical output.

In the present embodiment, the range extension system 100A may be mounted on a transport, and the transport may be a car, a ship, an aircraft, or other transports that may carry the range extension assembly 60. The transport uses at least the range extension assembly 60 as a power source (for example, the transport may be a hybrid electric car or a pure electric car), and the fuel thereof is delivered to the range extension assembly 60 via the fuel supply flow path control method of the range extension system 100A to be further converted into electrical energy and provided to the transport for use as a main power source or to charge the main battery of the transport to increase the mileage as a range extension system. It should be noted that, in the present embodiment, a fuel cell is used as the range extension assembly 60, but the invention is not limited thereto; in some embodiments, the range extension assembly 60 may also be a solid-state lithium battery, a solid-state zinc air battery, a solid-state battery, a metal fuel cell, an alkaline fuel cell, a proton exchange membrane fuel cell, a solid-state oxide fuel cell, a zinc air fuel cell, or a direct methanol fuel cell. In some embodiments, the range extension assembly 60 is thermoelectric; or, the range extension assembly 60 may be any type as long as after the fuel is added, electrical energy is immediately generated via physical, chemical, or biological reactions, and lost electrical energy does not need to be recovered via external charging.

In the present embodiment, the fuel supply unit is, for example, a blower 95 or a first fuel storage device 20.

Figure 2:
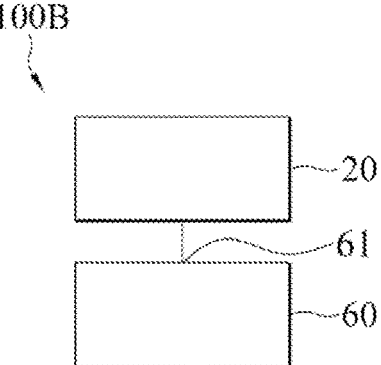
FIG. 2 shows a brief system block diagram of the range extension system of the second embodiment of the invention.

FIG. 2 shows a brief system block diagram of a range extension system 100B of the second embodiment of the invention. As shown in FIG. 2, in the present embodiment, the range extension system 100B further includes the first fuel storage device 20 in addition to the range extension assembly 60. The first fuel storage device 20 is configured to store the first fuel source and provide the first fuel source to the first fuel input portion 61.

Figure 3:
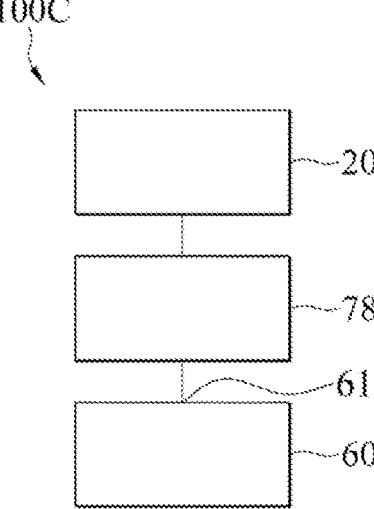
FIG. 3 shows a brief system block diagram of the range extension system of the third embodiment of the invention.

FIG. 3 shows a brief system block diagram of a range extension system 100C of the third embodiment of the invention. As shown in FIG. 3, in the present embodiment, in addition to the range extension assembly 60 and the first fuel storage device 20, the range extension system 100C further includes a first humidifier 78 communicated between the first fuel storage device 20 and the first fuel input portion 61 of the range extension assembly 60. Accordingly, the fuel source provided to the range extension 60 may contain some moisture to supplement the moisture contained in the polymer electrolyte membrane (e.g., ion exchange membrane) in the range extension assembly 60, thus avoiding voltage drop and reducing the probability of battery damage. For example, the first humidifier 78 may adopt a venturi structure to atomize the moisture and introduce the moisture into the first fuel source, which is then delivered to the range extension assembly 60, but the invention is not limited thereto. The first humidifier 78 may also be other humidification equipment applicable to fuel cells.

Figure 4:
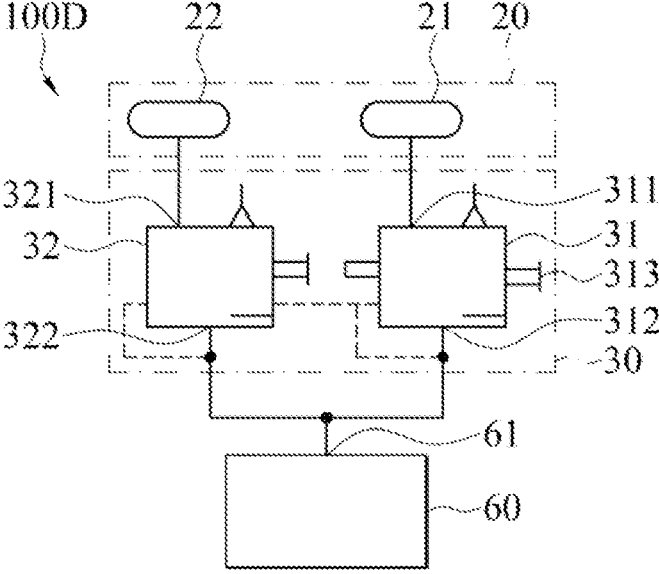
FIG. 4 shows a schematic diagram of the pipelines of the range extension system of the fourth embodiment of the invention.

FIG. 4 shows a schematic diagram of the pipelines of a range extension system 100D of the fourth embodiment of the invention. As shown in FIG. 4, in the present embodiment, the range extension system 100D further includes the first fuel storage device 20 and a first fuel source control device 30 in addition to the range extension assembly 60. The first fuel storage device 20 is configured to store the first fuel source and provide the first fuel source to the first fuel input portion 61. The first fuel source control device 30 is connected to the first fuel storage device 20. Specifically, the members are connected by the pipelines that may withstand a certain pressure, which is not repeated herein.

Referring to FIG. 4, the first fuel storage device 20 includes gas storage cylinders 21 and 22. The first fuel source may be oxygen or air, for example, but the invention is not limited thereto. Corresponding to the range extension assembly 60 using different types of fuel, the first fuel source may also be other fuel sources. In addition, the gas storage cylinders 21 and 22 may be commercially available high-pressure steel cylinders that may store high-pressure gas, but the invention is not limited thereto, and the gas storage cylinders 21 and 22 may also be other gas storage equipment.

Referring to FIG. 4, the first fuel source control device 30 includes a first action unit 31 and a second action unit 32 detachably connected to the first action unit 31. The first action unit 31 has a first input end 311 and a first output end 312, and the first action unit 31 is communicated with the gas storage cylinder 21 via the first input end 311 to receive the first fuel source. The second action unit 32 has a second input end 321 and a second output end 322, and the second action unit 32 is communicated with the gas storage cylinder 22 via the second input end 321 to receive the first fuel source.

When the first action unit 31 is actuated by the first action force, the first action unit 31 generates a first action stroke. In a case that the first action stroke is less than the first threshold value, the first action force drives the first action unit 31, so that the first fuel input portion 61 of the range extension assembly 60 receives the first fuel source from the first fuel source control device 30 via the first output end 312. Specifically, for example, in an embodiment, the first action unit 31 has an action portion 313, and the action method thereof may be mechanical, electrical, magnetic, electromagnetic, hydraulic, pneumatic, etc., and the action portion 313 is disposed at the operating position of the traffic work driver's seat (cockpit), and here, the action portion 313 may be, but not limited to, connected to a foot pedal. When the user operates (such as treads) the action portion 313 of the first action unit 31 with less action force, the action force only drives the first action unit 31 to open the separation valve between the first input end 311 and the first output end 312, so that the first input end 311 and the first output end 312 are communicated. But this action force is not enough to connect the first action unit 31 and propel the second action unit 32 to open the separation valve between the second input end 321 and the second output end 322, so that the second input end 321 and the second output end 322 are still not communicated. Therefore, the first fuel source is delivered to the first fuel input portion 61 of the range extension assembly 60 only via the first output end 312 of the first action unit 31.

Moreover, in a case that the first action stroke is greater than or equal to the first threshold value, the first action force drives the first action unit 31 to connect and propel the second action unit 32, so that the first fuel input portion 61 of the range extension assembly 60 receives the first fuel source from the first fuel source control device 30 via the first output end 312 and the second output end 322. In other words, when the user operates the action portion 313 of the first action unit 31 with a larger action force, the action force not only drives the first action unit 31 to open the separation valve between the first input end 311 and the first output end 312, so that the first input end 311 and the first output end 312 are communicated, but also drives the second action unit 32 to open the separation valve between the second input end 321 and the second output end 322, so that the second input end 321 and the second output end 322 are also communicated. Therefore, the first fuel source is simultaneously delivered to the range extension assembly 60 via the first output end 312 of the first action unit 31 and the second output end 322 of the second action unit 32.

In an embodiment, the range extension system includes the first fuel storage device 20, the first fuel source control device 30, the range extension assembly 60, and the first humidifier 78. In the present embodiment, the first humidifier 78 is communicated between the first fuel storage device 20 and the first fuel input portion 61 of the range extension assembly 60. The connection relationship between the components and the functions of the components are described above, and are not repeated herein.

Figure 5:
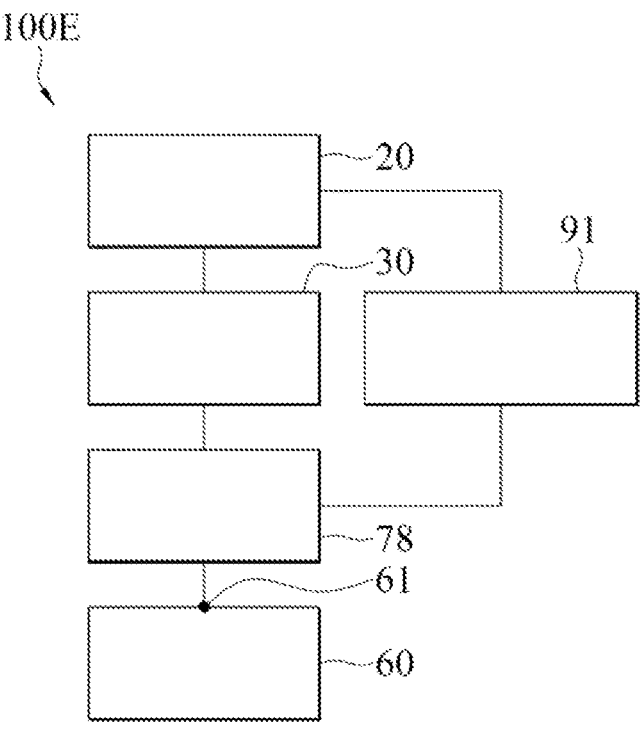
FIG. 5 shows a brief system block diagram of the range extension system of the fifth embodiment of the invention.

FIG. 5 shows a brief system block diagram of a range extension system 100E of the fifth embodiment of the invention. As shown in FIG. 5, in the present embodiment, the range extension system 100E includes the first fuel storage device 20, the first fuel source control device 30, the range extension assembly 60, the first humidifier 78, and a first fuel source auxiliary control device 91. The first fuel source auxiliary control device 91 is communicated between the first fuel storage device 20 and the first fuel input portion 61 of the range extension assembly 60 (in the present embodiment, directly communicated between the first fuel storage device 20 and the first humidifier 78). When the first fuel source auxiliary control device 91 is actuated by an auxiliary action force, the auxiliary action force drives the first fuel source auxiliary control device 91, so that the first fuel input portion 61 receives the first fuel source from the first fuel storage device 20.

Accordingly, when the central control equipment of the transport detects that power is insufficient, the driver may quickly obtain the first fuel source from the first fuel storage device 20 by operating the first fuel source auxiliary control device 91 and chemically react the first fuel source with the second fuel source in the range extension assembly 60 to supplement electric power.

Figure 6:
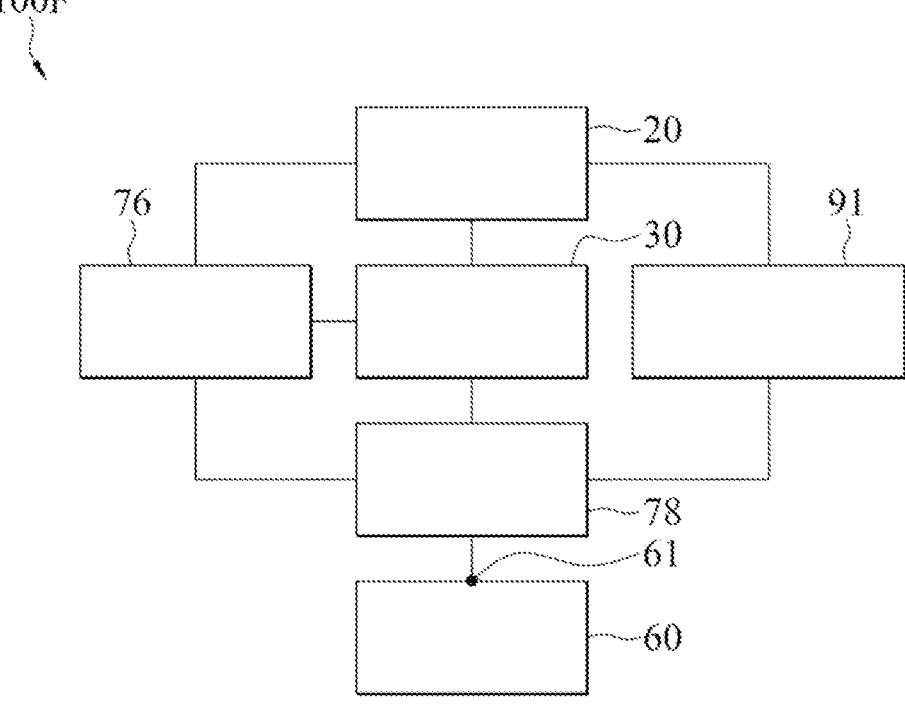
FIG. 6 shows a brief system block diagram of the range extension system of the sixth embodiment of the invention.

FIG. 6 shows a brief system block diagram of a range extension system 100F of the sixth embodiment of the invention. As shown in FIG. 6, in the present embodiment, the range extension system 100F includes the first fuel storage device 20, the first fuel source control device 30, the range extension assembly 60, the first humidifier 78, the first fuel source auxiliary control device 91, and a first pressure balance valve 76. The first pressure balance valve 76 may be disposed under the chassis of the transport, actuated with the load of the transport, and communicated between the first fuel storage device 20 and the first fuel input portion 61 of the range extension assembly 60 (in the present embodiment, directly communicated between the first fuel storage device 20 and the first humidifier 78).

Accordingly, as the load of the transport is increased, the first pressure balance valve 76 may be driven to open, so that the first fuel storage device 20 is also delivered to the first fuel input portion 61 of the range extension assembly 60 via the pipelines in the first pressure balance valve 76, thus increasing the power output of the range extension assembly 60.

Figure 7A:
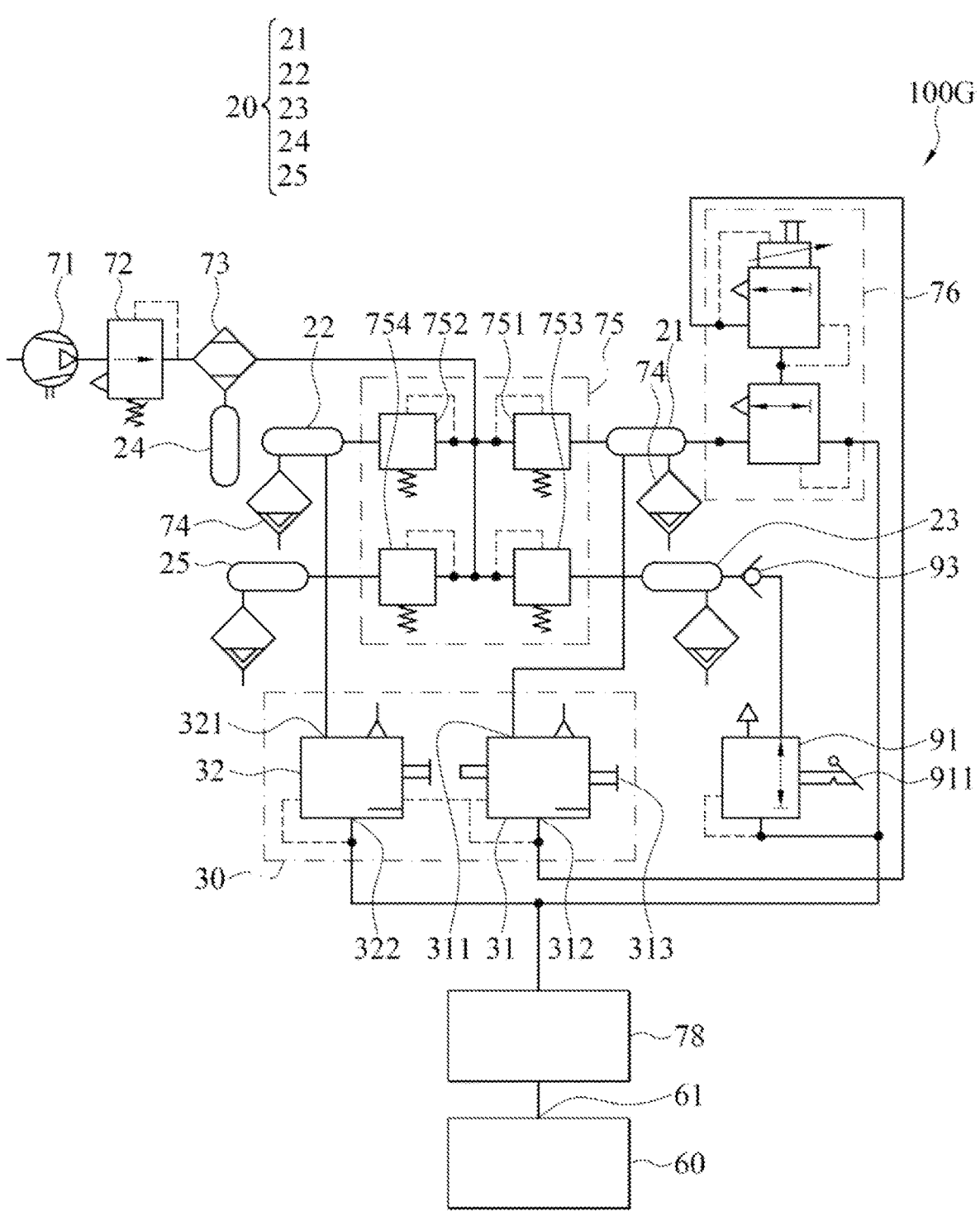
FIG. 7A shows a schematic diagram of the pipelines of the range extension system of the seventh embodiment of the invention.
Figure 7B:
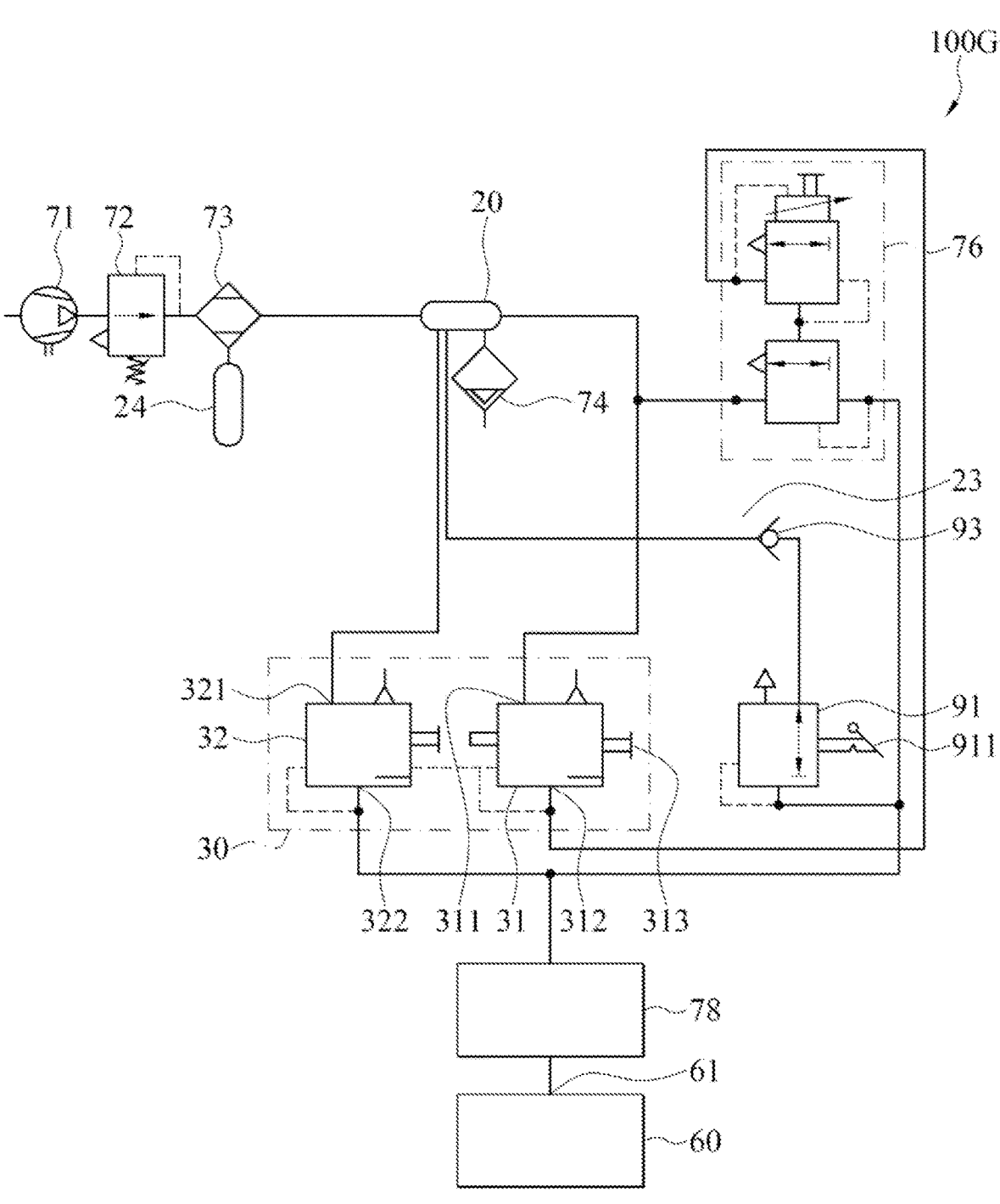
FIG. 7B shows a schematic diagram (2) of the pipelines of the range extension system of the seventh embodiment of the invention.
Figure 7C:
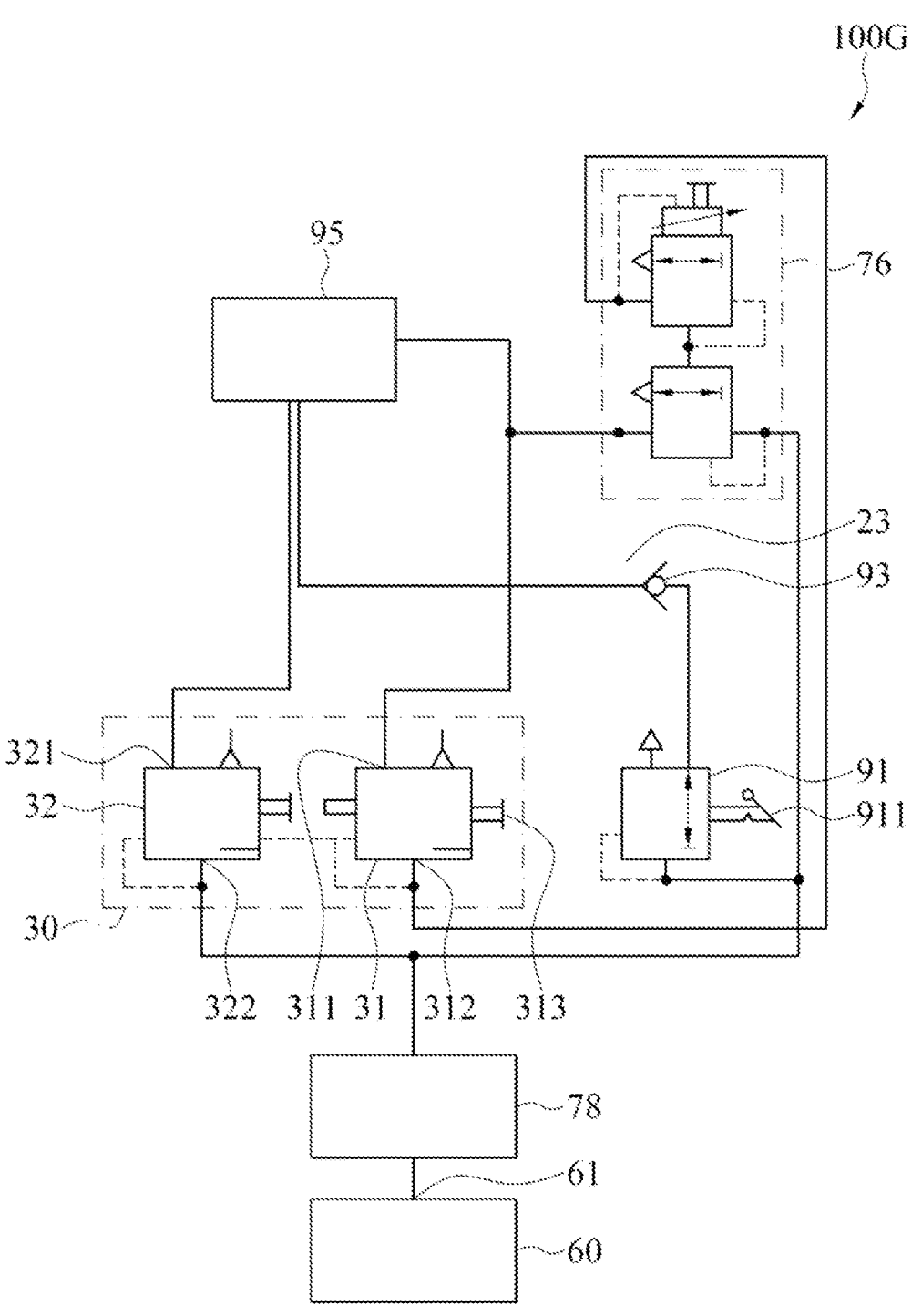
FIG. 7C shows a schematic diagram (3) of the pipelines of the range extension system of the seventh embodiment of the invention.

FIG. 7A shows a schematic diagram of the pipelines of a range extension system 100G of the seventh embodiment of the invention. FIG. 7B shows a schematic diagram (2) of the pipelines of the range extension system of the seventh embodiment of the invention. FIG. 7C shows a schematic diagram (3) of the pipelines of the range extension system of the seventh embodiment of the invention. As shown in FIG. 7A, in the present embodiment, the range extension system 100G includes the first fuel storage device 20, the first fuel source control device 30, the range extension assembly 60, the first humidifier 78, the first fuel source auxiliary control device 91, the first pressure balance valve 76, an air compressor 71, a pressure regulating valve 72, an air dryer 73, a multi-circuit protection valve 75, and a discharge valve 74.

As shown in FIG. 7A, in the present embodiment, the air compressor 71 is communicated with the first fuel storage device 20. The air compressor 71 is further connected to the atmosphere and configured to compress air into the first fuel source. Thereby, the air may be continuously compressed into compressed air via the air compressor 71 and stored in the gas storage cylinders 21 and 22. In the present embodiment, the first fuel source is air; to be more precise, in the present embodiment, the range extension assembly 60 generates electrical energy via a chemical reaction of hydrogen mixed with oxygen in the air.

As shown in FIG. 7A, in the present embodiment, the pressure regulating valve 72 is disposed between the air compressor 71 and the first fuel storage device 20 and may be configured to adjust the pressure of the first fuel source. In this way, overburden of the pipelines connected between the elements causing rupture of the pipelines and resulting in the danger of leakage of the gas source may be avoided.

As shown in FIG. 7A, in the present embodiment, the air dryer 73 is communicated between the air compressor 71 and the first fuel source control device 30, and may be configured to remove moisture in the compressed air compressed by the air compressor 71. It should be noted that, in the present embodiment, the first fuel storage device 20 may further include a gas storage cylinder 24 to dry the damp air dryer 73, and the air dryer 73 is communicated between the gas storage cylinder 24 and the first fuel source control device 30.

As shown in FIG. 7A, in the present embodiment, a range extension system 100G includes a plurality of discharge valves 74, and each of the discharge valves 74 is communicated with the atmosphere and the gas storage cylinders 21 and 22, respectively. Thereby, the condensed water in the gas storage cylinders 21 and 22 may be discharged to the atmosphere via the discharge valves 74, and the pressure of the gas storage cylinders 21 and 22 may be maintained.

As shown in FIG. 7A, in the present embodiment, the multi-circuit protection valve 75 is communicated between the air compressor 71 and the gas storage cylinders 21 and 22, and the multi-circuit protection valve 75 controls the gas storage cylinder 21 to be communicated with the first action unit 31 via the first input end 311 according to the pressure threshold value, and controls the gas storage cylinder 22 to be communicated with the second action unit 32 via the second input end 321 according to the pressure threshold value. Specifically, the pressure threshold value is a parameter of the multi-circuit protection valve 75 itself. When the actual pressure value is lower than the pressure threshold value, the valve assembly 751 is closed; when the actual pressure value is greater than or equal to the pressure threshold value, the valve assembly 751 is opened.

In other words, when the valve assembly 751 in the multi-circuit protection valve 75 corresponding to the gas storage cylinder 21 reaches the set opening pressure, the valve assembly 751 is opened, so that the first fuel source may be delivered to the gas storage cylinder 21 via the multi-circuit protection valve 75, in order to avoid abnormal pressure relief of any circuit resulting in the leakage of the whole system pressure, and then delivered to the first fuel source control device 30; moreover, when the multi-circuit protection valve 75 is in an abnormal pressure relief condition, the corresponding valve assembly 751 may be closed.

Similarly, when the valve assembly 752 in the multi-circuit protection valve 75 corresponding to the gas storage cylinder 22 reaches the set opening pressure, the valve assembly 752 is opened, so that the first fuel source may be delivered to the gas storage cylinder 22 via the multi-circuit protection valve 75, in order to avoid abnormal pressure relief of any circuit resulting in the leakage of the whole system pressure, and then delivered to the first fuel source control device 30; moreover, when the multi-circuit protection valve 75 is in an abnormal pressure relief condition, the corresponding valve assembly 752 may be closed.

As mentioned above, when one circuit of the multi-circuit protection valve 75 fails, the other circuits may still be operated normally, and the failure circuit may be immediately closed. In the present embodiment, the multi-circuit protection valve 75 is a four-circuit protection valve and has four valve assemblies 751, 752, 753, and 754, but the invention is not limited thereto, and the number of valve assemblies of the multi-circuit protection valve 75 may correspond to the number of gas storage cylinders; specifically, here, the valve assembly 751 of the multi-circuit protection valve 75 corresponds to the gas storage cylinder 21, and the valve assembly 752 corresponds to the gas storage cylinder 22.

Referring to FIG. 7B, in some embodiments, the range extension system includes the first fuel storage device 20, the first fuel source control device 30, the range extension assembly 60, the first humidifier 78, the first fuel source auxiliary control device 91, the first pressure balance valve 76, the air compressor 71, the pressure regulating valve 72, and the air dryer 73. The first fuel storage device 20 is connected to the air dryer 73 and the discharge valve 74, respectively, and the storage device 20 is communicated with the first fuel source auxiliary control device 91, the first input end 311 of the first action unit 31, the second input end 321 of the second action unit 32, and the first pressure balance valve 76.

Referring to FIG. 7C, in some embodiments, the range extension system includes the blower 95, the first fuel source control device 30, the range extension assembly 60, the first humidifier 78, the first fuel source auxiliary control device 91, and the first pressure balance valve 76. The blower 95 is communicated with the first fuel source auxiliary control device 91, the first input end 311 of the first action unit 31, the second input end 321 of the second action unit 32, and the first pressure balance valve 76.

Figure 8:
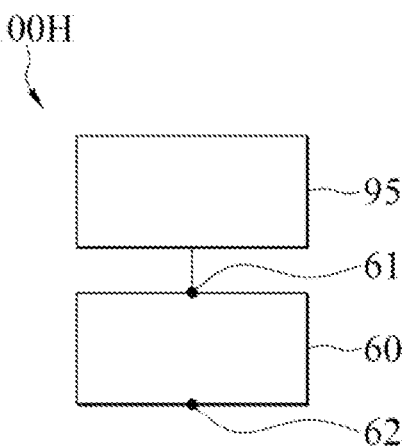
FIG. 8 shows a brief system block diagram of the range extension system of the eighth embodiment of the invention.

FIG. 8 shows a brief system block diagram of a range extension system 100H of the third embodiment of the invention. As shown in FIG. 8, in the present embodiment, the range extension system 100H further includes the blower 95 in addition to the range extension assembly 60. The blower 95 is configured to provide the first fuel source to the first fuel input portion 61 of the range extension assembly 60. In other words, in the present embodiment, the first fuel source is air.

In some embodiments, the range extension system includes the range extension assembly 60, the blower 95, and the first humidifier 78. In these embodiments, the first humidifier 78 is communicated between the blower 95 and the first fuel input portion 61 of the range extension assembly 60. The connection relationship between the components and the functions of the components are described above, and are not repeated herein.

In some embodiments, the range extension system includes the first fuel storage device 20, the range extension assembly 60, the blower 95, and the first humidifier 78. In these embodiments, the first fuel source input 61 selectively receives the first fuel source from the first fuel storage device 20 or the blower 95. The connection relationship between the components and the functions of the components are described above, and are not repeated herein.

In some embodiments, the range extension system includes the first fuel storage device 20, the range extension assembly 60, and the blower 95. The connection relationship between the components and the functions of the components are described above, and are not repeated herein. It should be mentioned that, in an embodiment in which the range extension system includes both the first fuel storage device 20 and the blower 95, in the range extension system, the first humidifier 78 may be disposed at at least one of the first fuel storage device 20 and the blower 95; alternatively, the first humidifier 78 may be disposed between the first fuel storage device 20 and the blower 95, which is not repeated herein.

In some embodiments, the range extension system includes the first fuel storage device 20, the first fuel source control device 30, the range extension assembly 60, and the blower 95. Specifically, in these embodiments, the range extension system may have a gas source switching mechanism to maintain the normal operation of the range extension system via the blower 95 when the first fuel source control device 30 may not be operated normally. The gas source may also be provided by the blower 95 alone. In other words, in the present embodiment, the first fuel source input 61 selectively receives the first fuel source from the first fuel storage device 20 (via the first fuel source control device 30) or the blower.

In some embodiments, the range extension system includes the first fuel storage device 20, the first fuel source control device 30, the range extension assembly 60, the blower 95, and the first humidifier 78. The connection relationship between the components and the functions of the components are described above, and are not repeated herein.

In some embodiments, the range extension system includes the first fuel storage device 20, the first fuel source control device 30, the range extension assembly 60, the blower 95, the first humidifier 78, and the first fuel source auxiliary control device 91. The connection relationship between the components and the functions of the components are described above, and are not repeated herein.

In some embodiments, the range extension system includes the first fuel storage device 20, the first fuel source control device 30, the range extension assembly 60, the blower 95, the first humidifier 78, the first fuel source auxiliary control device 91, and the first pressure balance valve 76. The connection relationship between the components and the functions of the components are described above, and are not repeated herein.

Figure 9:
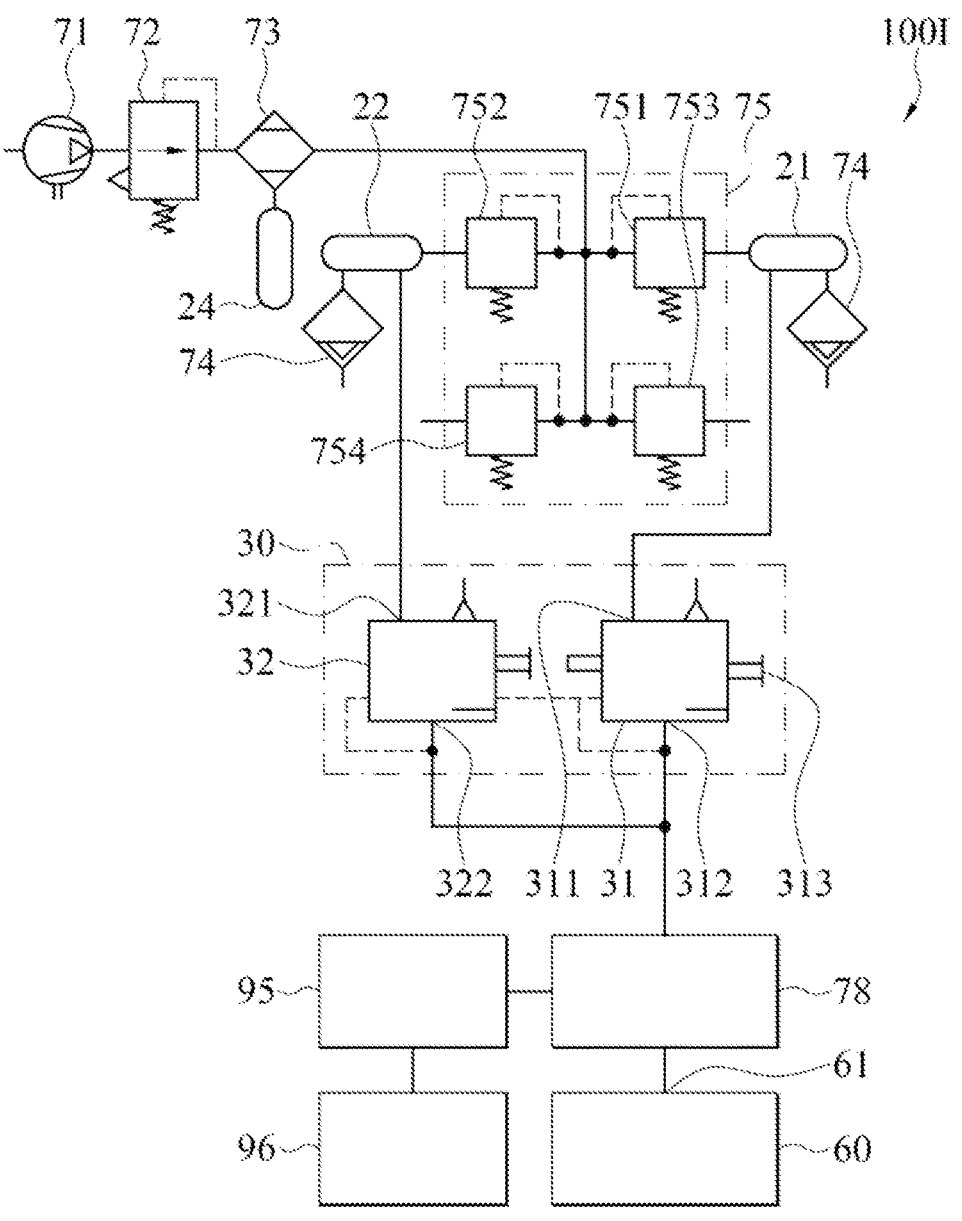
FIG. 9 shows a schematic diagram of the pipelines of the range extension system of the ninth embodiment of the invention.

FIG. 9 shows a schematic diagram of the pipelines of a range extension system 100I of the ninth embodiment of the invention. As shown in FIG. 9, in the present embodiment, the range extension system 100I includes the first fuel storage device 20, the first fuel source control device 30, the range extension assembly 60, the first humidifier 78, the first fuel source auxiliary control device 91, the first pressure balance valve 76, the air compressor 71, the pressure regulating valve 72, the air dryer 73, the multi-circuit protection valve 75, the discharge valve 74, the blower 95, and a blower controller 96. Referring to FIG. 9, the blower controller 96 controls the blower 95 to provide the first fuel source. In other words, in the present embodiment, the range extension system 100I may have a gas source switching mechanism, so that when the first fuel source control device 30 fails to be operated normally, the blower controller 96 controls the blower 95 to provide the first fuel source to the range extension assembly 60. Thus, the normal operation of the range extension system 100I is maintained. The connection relationship between the remaining components and the functions of the components are described above, and are not repeated herein.

In some embodiments, the range extension system includes the first fuel storage device 20, the first fuel source control device 30, the range extension assembly 60, the first humidifier 78, the first fuel source auxiliary control device 91, the first pressure balance valve 76, the air compressor 71, the pressure regulating valve 72, the air dryer 73, and the blower controller 96. The connection relationship between the components and the functions of the components are described above, and are not repeated herein.

Figure 10:
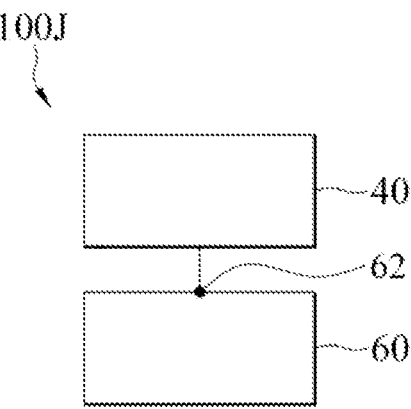
FIG. 10 shows a brief system block diagram of the range extension system of the tenth embodiment of the invention.

FIG. 10 shows a brief system block diagram of a range extension system 100J of the tenth embodiment of the invention. As shown in FIG. 10, in the present embodiment, the range extension system 100J further includes a second fuel storage device 40 in addition to the range extension assembly 60. The second fuel storage device 40 is configured to store the second fuel source and provide the second fuel source to the second fuel input portion 62.

Figure 11:
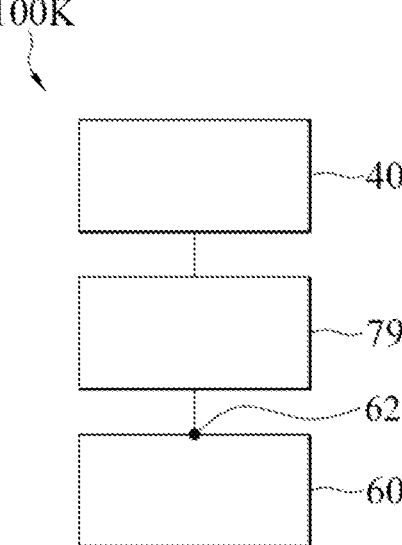
FIG. 11 shows a brief system block diagram of the range extension system of the eleventh embodiment of the invention.

FIG. 11 shows a brief system block diagram of a range extension system 100K of the eleventh embodiment of the invention. As shown in FIG. 11, in the present embodiment, in addition to the range extension assembly 60 and the second fuel storage device 40, the range extension system 100K further includes a second humidifier 79 communicated between the second fuel storage device 40 and the second fuel input portion 62 of the range extension assembly 60. Accordingly, the fuel source provided to the range extension 60 may contain some moisture to supplement the moisture contained in the polymer electrolyte membrane (e.g., ion exchange membrane) in the range extension assembly 60, thus avoiding voltage drop and reducing the probability of battery damage. Similarly, the second humidifier 79 may also adopt a venturi structure to atomize the moisture and introduce the moisture into the second fuel source, which is then delivered to the range extension assembly 60, but the invention is not limited thereto. The second humidifier 79 may also be other humidification equipment applicable to fuel cells.

Figure 12:
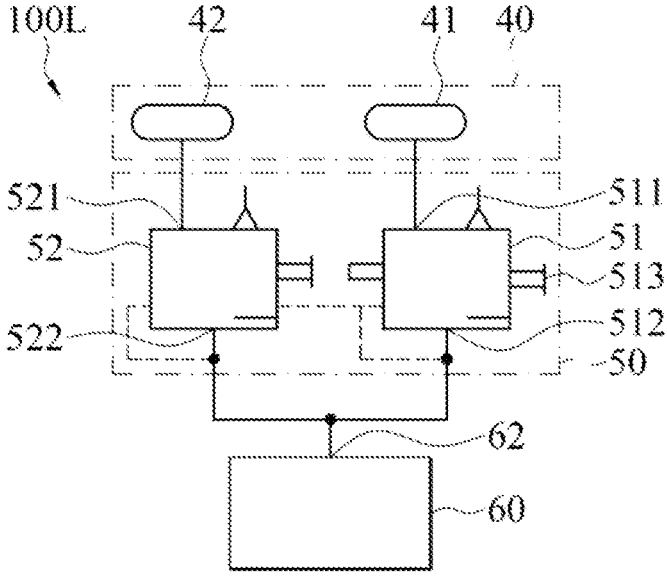
FIG. 12 shows a schematic diagram of the pipelines of the range extension system of the twelfth embodiment of the invention.

FIG. 12 shows a schematic diagram of the pipelines of a range extension system 100L of the twelfth embodiment of the invention. As shown in FIG. 12, in the present embodiment, the range extension system 100L further includes the second fuel storage device 40 and a second fuel source control device 50 in addition to the range extension assembly 60. The second fuel storage device 40 is configured to store and provide the second fuel source to the second fuel input portion 62. The second fuel source control device 50 is connected to the second fuel storage device 40.

Referring to FIG. 12, the second fuel storage device 40 includes a gas storage cylinder 41 and a gas storage cylinder 42. The second fuel source is different from the first fuel source, and the second fuel source may be, for example, but not limited to, hydrogen. In addition, the gas storage cylinders 41 and 42 may be commercially available high-pressure steel cylinders that may store high-pressure gas, but the invention is not limited thereto, and the gas storage cylinders 41 and 42 may also be other gas storage equipment, such as low-pressure hydrogen storage bottles.

For example, the gas storage cylinders may also be low-pressure gas storage cylinders and may store low-pressure gas; the low-pressure gas storage cylinders may adopt a hydrogen storage material of a metal oxide, a nanomaterial, a rare earth material, or a metal alloy, and store hydrogen by adsorbing hydrogen on the material. In addition, for the low-pressure gas storage cylinders, a quick connector may also be included to facilitate the user's operation.

Referring to FIG. 12, the second fuel source control device 50 includes a third action unit 51 and a fourth action unit 52 detachably connected to the third action unit 51. The third action unit 51 has a third input end 511 and a third output end 512, and the third action unit 51 is communicated with the gas storage cylinder 41 via the third input end 511 to receive the second fuel source. The fourth action unit 52 has a fourth input end 521 and a fourth output end 522, and the fourth action unit 52 is communicated with the gas storage cylinder 42 via the fourth input end 521 to receive the second fuel source.

Similarly, when the third action unit 51 is actuated by the second action force, the third action unit 51 generates a second action stroke. If the second action stroke is less than the second threshold value, the second action force drives the third action unit 51, so that the second fuel input portion 62 of the range extension assembly 60 receives the second fuel source from the second fuel source control device 50 via the third output end 512. Specifically, for example, the third action unit 51 has an action portion 513, and the action method thereof may be mechanical, electrical, magnetic, electromagnetic, hydraulic, pneumatic, etc., and the action portion 513 is disposed at the operating position of the traffic work driver's seat (cockpit), and here, the action portion 513 may be, but not limited to, connected to a foot pedal. When the user operates (such as treads) the action portion 513 of the third action unit 51 with less action force, the action force only drives the third action unit 51 to open the separation valve between the third input end 511 and the third output end 512, so that the third input end 511 and the third output end 512 are communicated. But this action force is not enough to connect the third action unit 51 and propel the fourth action unit 52 to open the separation valve between the fourth input end 521 and the fourth output end 522, so that the fourth input end 521 and the fourth output end 522 are still not communicated. Therefore, the second fuel source is delivered to the second fuel input portion 62 of the range extension assembly 60 only via the third output end 512 of the third action unit 51.

Moreover, if the second action stroke is greater than or equal to the second threshold value, the second action force drives the third action unit 51 to connect and propel the fourth action unit 52, so that the second fuel input portion 62 of the range extension assembly 60 receives the second fuel source from the second fuel source control device 50 via the third output end 512 and the fourth output end 522. In other words, when the user operates the action portion 513 of the third action unit 51 with a larger action force, the action force not only drives the third action unit 51 to open the separation valve between the third input end 511 and the third output end 512, so that the third input end 511 and the third output end 512 are communicated, but also drives the fourth action unit 52 to open the separation valve between the fourth input end 521 and the fourth output end 522, so that the fourth input end 521 and the fourth output end 522 are also communicated. Therefore, the second fuel source is simultaneously delivered to the second fuel input portion 62 of the range extension assembly 60 via the third output end 512 of the third action unit 51 and the fourth output end 522 of the fourth action unit 52.

In an embodiment, the range extension system includes the second fuel storage device 40, the second fuel source control device 50, the range extension assembly 60, and the second humidifier 79. In the present embodiment, the second humidifier 79 is communicated between the second fuel storage device 40 and the second fuel input portion 62 of the range extension assembly 60. The connection relationship between the components and the functions of the components are described above, and are not repeated herein.

Figure 13:
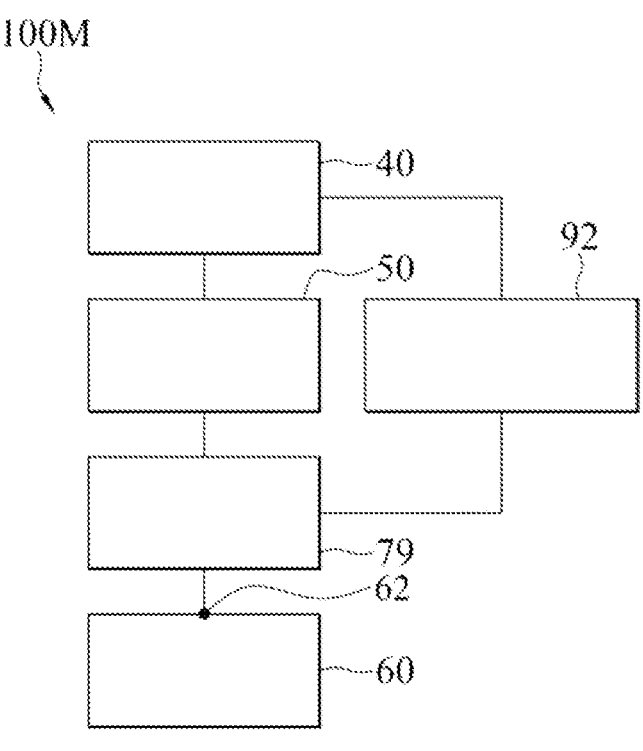
FIG. 13 shows a brief system block diagram of the range extension system of the thirteenth embodiment of the invention.

FIG. 13 shows a brief system block diagram of a range extension system 100M of the thirteenth embodiment of the invention. As shown in FIG. 13, in the present embodiment, the range extension system 100M includes the second fuel storage device 40, the second fuel source control device 50, the range extension assembly 60, the second humidifier 79, and a second fuel source auxiliary control device 92. The second fuel source auxiliary control device 92 is communicated between the second fuel storage device 40 and the second fuel input portion 62 of the range extension assembly 60 (in the present embodiment, directly communicated between the second fuel storage device 40 and the second humidifier 79). When the second fuel source auxiliary control device 92 is actuated by an auxiliary action force, the auxiliary action force drives the second fuel source auxiliary control device 92, so that the second fuel input portion 62 receives the second fuel source from the second fuel storage device 40.

Accordingly, when the central control equipment of the transport detects that power is insufficient, the driver may quickly obtain the second fuel source from the second fuel storage device 40 by operating the second fuel source auxiliary control device 92 and chemically react the second fuel source with the first fuel source in the range extension assembly 60 to supplement electric power.

Figure 14:
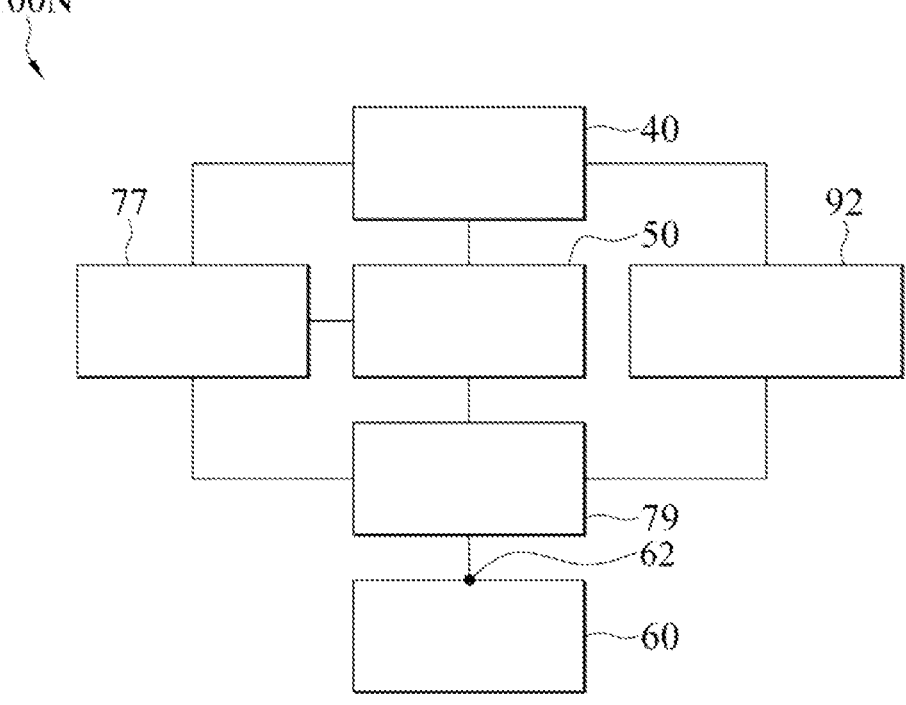
FIG. 14 shows a brief system block diagram of the range extension system of the fourteenth embodiment of the invention.

FIG. 14 shows a brief system block diagram of a range extension system 100N of the fourteenth embodiment of the invention. As shown in FIG. 14, in the present embodiment, the range extension system 100N includes the second fuel storage device 40, the second fuel source control device 50, the range extension assembly 60, the second humidifier 79, the second fuel source auxiliary control device 92, and a second pressure balance valve 77. Similarly, the second pressure balance valve 77 may be disposed under the chassis of the transport, actuated with the load of the transport, and communicated between the second fuel storage device 40 and the second fuel input portion 62 of the range extension assembly 60 (in the present embodiment, directly communicated between the second fuel storage device 40 and the second humidifier 79).

Accordingly, as the load of the transport is increased, the second pressure balance valve 77 may be driven to open, so that the second fuel storage device 40 is also delivered to the second fuel input portion 62 of the range extension assembly 60 via the pipelines in the second pressure balance valve 77, thus increasing the power output of the range extension assembly 60.

Figure 15A:
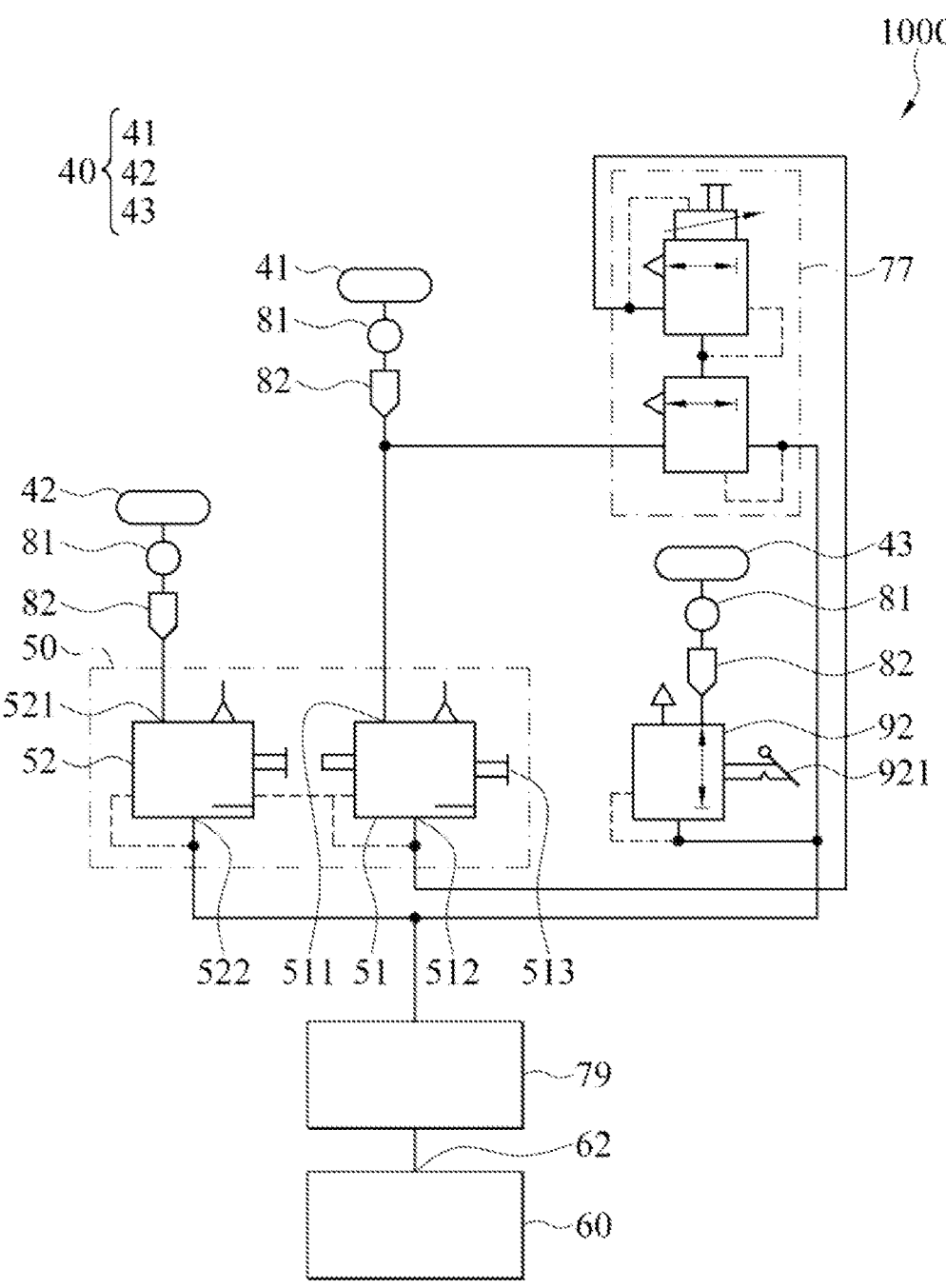
FIG. 15A shows a schematic diagram of the pipelines of the range extension system of the fifteenth embodiment of the invention.
Figure 15B:
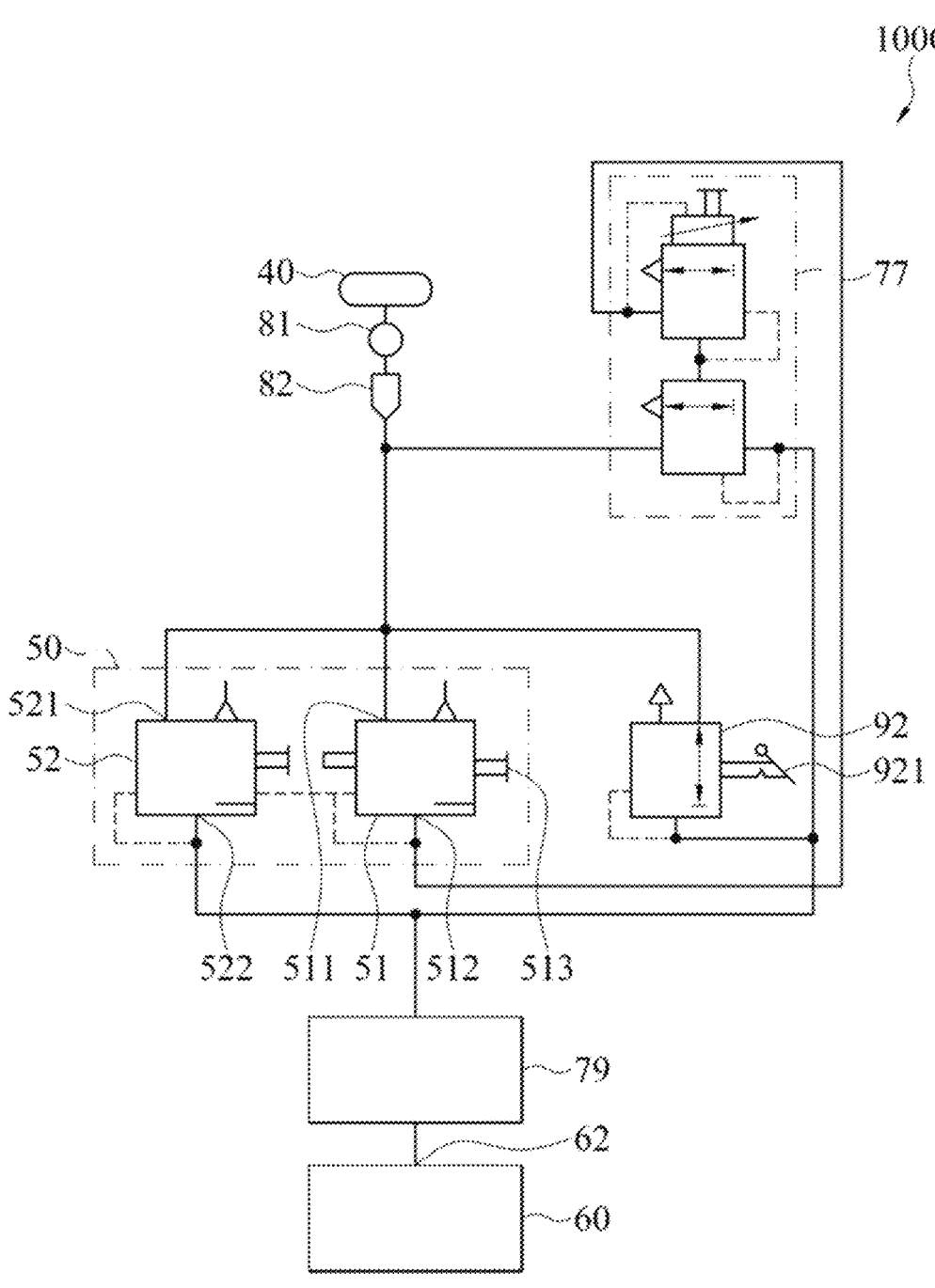
FIG. 15B shows a schematic diagram (2) of the pipelines of the range extension system of the fifteenth embodiment of the invention.

FIG. 15A shows a schematic diagram of the pipelines of a range extension system 100O of the fifteenth embodiment of the invention. FIG. 15B shows a schematic diagram (2) of the pipelines of the range extension system of the fifteenth embodiment of the invention.

As shown in FIG. 15A, in the present embodiment, the range extension system 100O includes the second fuel storage device 40, the second fuel source control device 50, the range extension assembly 60, the second humidifier 79, the second fuel source auxiliary control device 92, the second pressure balance valve 77, a fuel regulator 81, and a flow meter 82.

As shown in FIG. 15A, in the present embodiment, the fuel regulator 81 and the flow meter 82 are communicated between the gas storage cylinders 41 and 42 of the second fuel storage device 40 and the second fuel source control device 50. Further, the fuel regulator 81 includes a screening program, a pressure regulator, and a lubricator. Therefore, before the gas stored in the gas storage cylinders 41 and 42 is provided to the range extension assembly 60 for use, gas impurities and moisture are filtered via the screening program, and then the pressure is controlled by the pressure regulator. The flow meter 82 is configured to measure the flow of the fuel source passing through the segment pipeline.

In some embodiments, the range extension system includes the first fuel storage device 20, the second fuel storage device 40, and the range extension assembly 60. The connection relationship between the components and the functions of the components are described above, and are not repeated herein.

In some embodiments, the range extension system includes the first fuel storage device 20, the second fuel storage device 40, the range extension assembly 60, the first humidifier 78, and the second humidifier 79. The connection relationship between the components and the functions of the components are described above, and are not repeated herein.

In some embodiments, the range extension system 100G of FIG. 7A and the range extension system 100O of FIG. 15A are suitable for combined use. The range extension system 100G of FIG. 7B and the range extension system 100O of FIG. 15A are suitable for combined use.

As shown in FIG. 15B, the fuel regulator 81 and the flow meter 82 are communicated with the second fuel storage device 40 and the flow meter 82 is communicated with the second fuel source auxiliary control device 92, the third input end 511 of the third action unit 51, the fourth input end 521 of the fourth action unit 52, and the second pressure balance valve 77. Further, the fuel regulator 81 includes a screening program, a pressure regulator, and a lubricator. Therefore, before the gas stored in the second fuel storage device 40 is provided to the range extension assembly 60 for use, gas impurities and moisture are filtered via the screening program, and then the pressure is controlled by the pressure regulator. The flow meter 82 is configured to measure the flow of the fuel source passing through the segment pipeline. It should be noted that, in other embodiments in which the range extension system includes the second fuel storage device 40, the fuel regulator 81 and the flow meter 82 may also be disposed.

In some embodiments, the range extension system 100O of FIG. 15B and the range extension system 100G of FIG. 7A are suitable for combined use. The range extension system 100O of FIG. 15B and the range extension system 100G of FIG. 7B are suitable for combined use.

Figure 16:
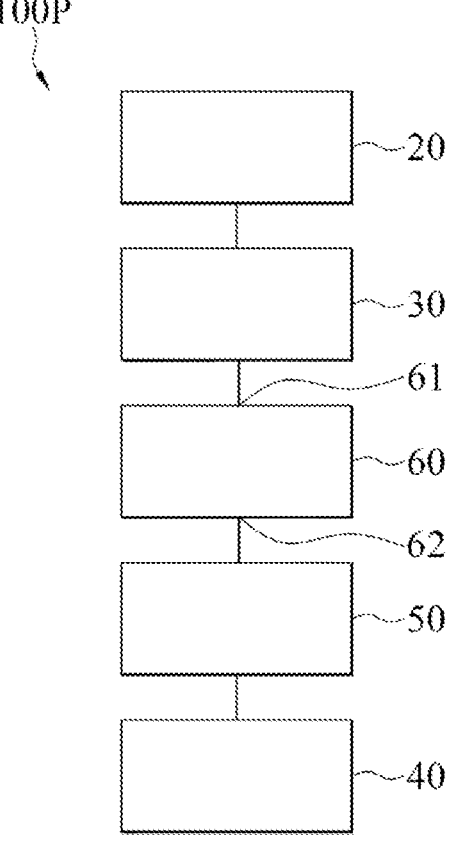
FIG. 16 shows a schematic diagram of the pipelines of the range extension system of the sixteenth embodiment of the invention.
Figure 17:
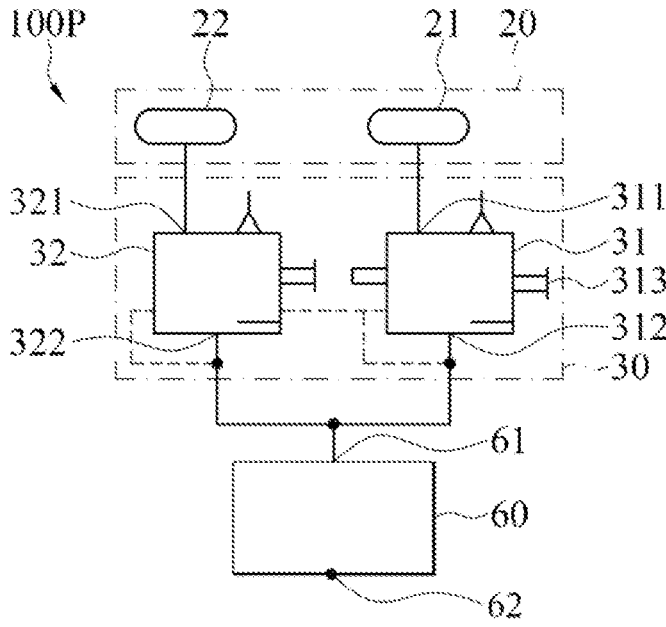
FIG. 17 shows a partial schematic diagram (1) of the pipelines of the range extension system of the sixteenth embodiment of the invention.
Figure 18:
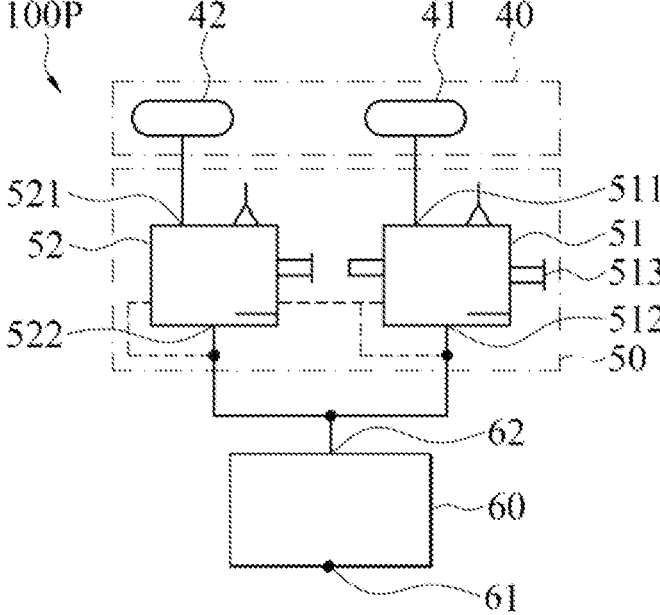
FIG. 18 shows a partial schematic diagram (2) of the pipelines of the range extension system of the sixteenth embodiment of the invention.

FIG. 16 shows a brief system block diagram of the range extension system of the sixteenth embodiment of the invention. FIG. 17 shows a partial schematic diagram (1) of the pipelines of the range extension system of the sixteenth embodiment of the invention. FIG. 18 shows a partial schematic diagram (2) of the pipelines of the range extension system of the sixteenth embodiment of the invention. For ease of explanation, the corresponding members and pipelines of the first fuel source are shown in FIG. 17, and the corresponding members and pipelines of the second fuel source are shown in FIG. 18, that is, the range extension assembly 60 in FIG. 17 and FIG. 18 is the same.

Referring to FIG. 16 to FIG. 18, in the present embodiment, a range extension system 100P includes the first fuel storage device 20, the first fuel source control device 30, the second fuel storage device 40, the second fuel source control device 50, and the range extension assembly 60. The first fuel source control device 30 is connected to the first fuel storage device 20, the second fuel source control device 50 is connected to the second fuel storage device 40, and the range extension assembly 60 is connected to the first fuel source control device 30 and the second fuel source control device 50 via the first fuel input portion 61 and the second fuel input portion 62, respectively.

It should be noted that, in the present embodiment, the range extension system 100P includes the first fuel source control device 30 and the second fuel source control device 50 at the same time. Therefore, the action portion 313 of the first action unit 31 and the action portion 513 of the third action unit 51 may be integrated into the same assembly (e.g., but not limited to, a pedal). Thus, the user operates the assembly to simultaneously drive the first fuel source control device 30 and the second fuel source control device 50. Therefore, via the configuration of the present embodiment, the first fuel source and the second fuel source may be delivered to the range extension assembly 60 in one operation.

In an embodiment, the range extension system includes the first fuel storage device 20, the first fuel source control device 30, the second fuel storage device 40, the second fuel source control device 50, the range extension assembly 60, the first humidifier 78, and the second humidifier 79. The connection relationship between the components and the functions of the components are described above, and are not repeated herein.

In an embodiment, the range extension system includes the first fuel storage device 20, the first fuel source control device 30, the second fuel storage device 40, the second fuel source control device 50, the range extension assembly 60, the first humidifier 78, the second humidifier 79, the first fuel auxiliary control device 91, and the second fuel auxiliary control device 92. The connection relationship between the components and the functions of the components are described above, and are not repeated herein.

In an embodiment, the range extension system includes the first fuel storage device 20, the first fuel source control device 30, the second fuel storage device 40, the second fuel source control device 50, the range extension assembly 60, the first humidifier 78, the second humidifier 79, the first fuel auxiliary control device 91, the second fuel auxiliary control device 92, the first pressure balance valve 76, and the second pressure balance valve 77. The connection relationship between the components and the functions of the components are described above, and are not repeated herein.

Figure 19:
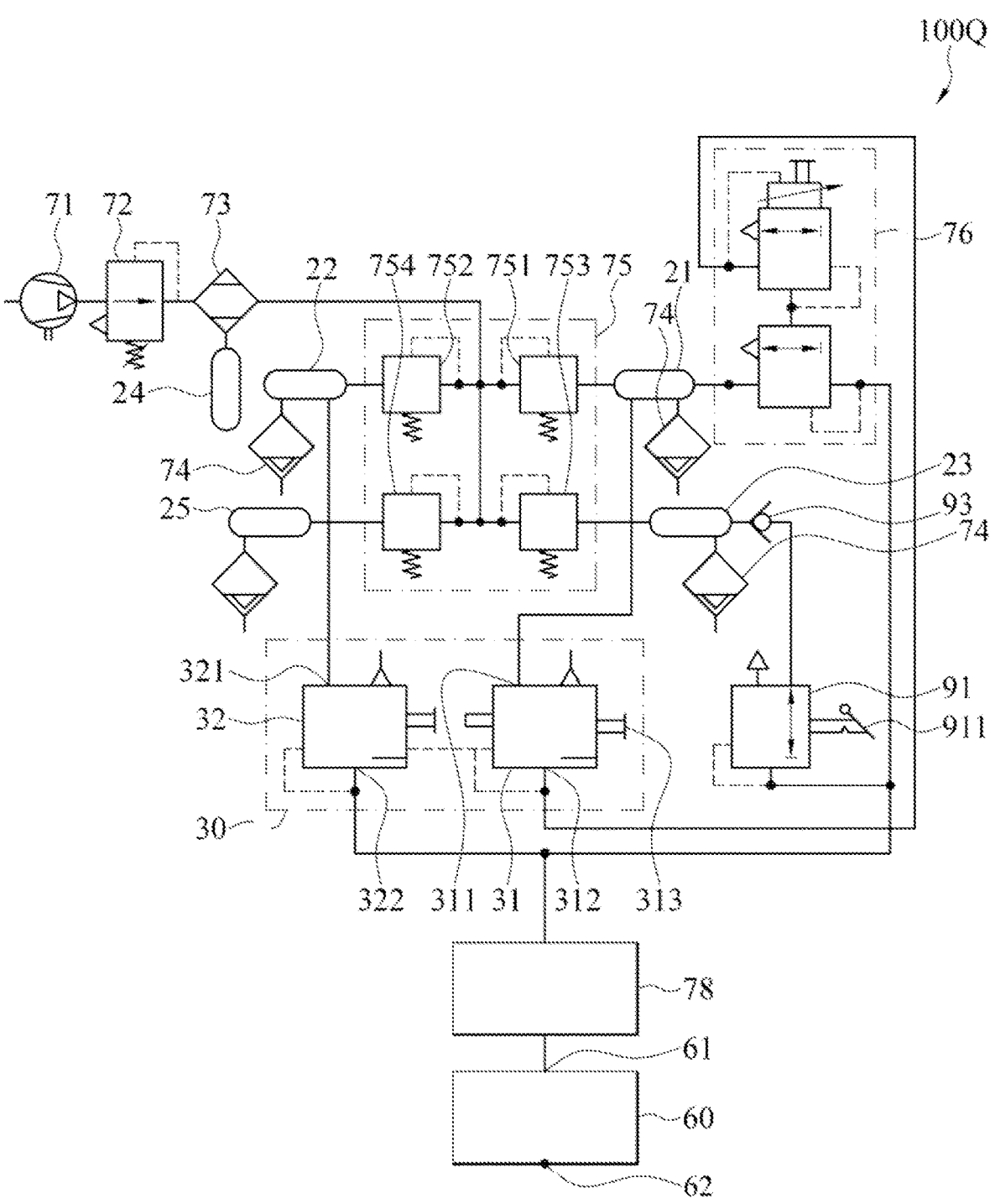
FIG. 19 shows a partial schematic diagram (1) of the pipelines of the range extension system of the seventeenth embodiment of the invention.
Figure 20:
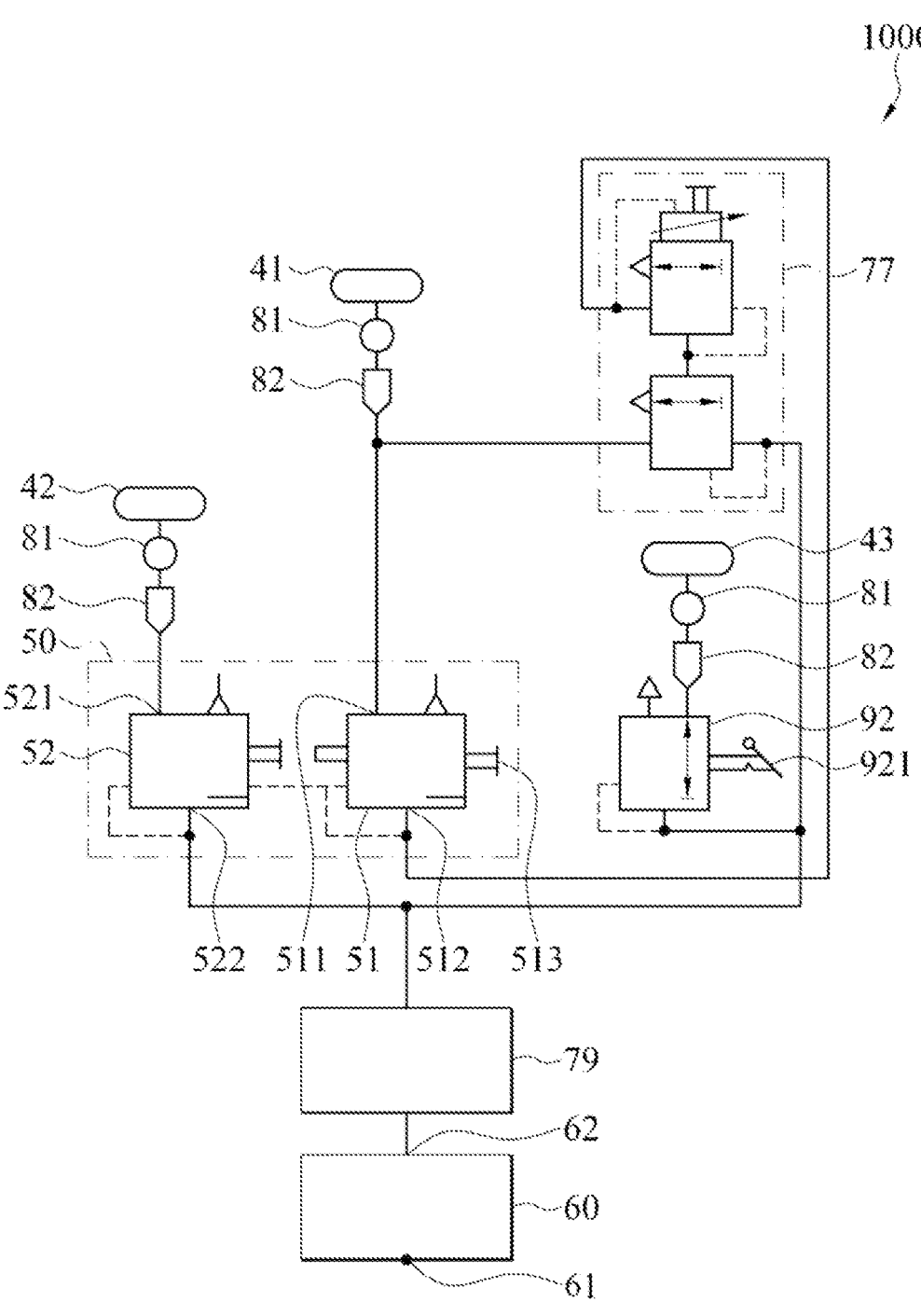
FIG. 20 shows a partial schematic diagram (2) of the pipelines of the range extension system of the seventeenth embodiment of the invention.

FIG. 19 shows a partial schematic diagram (1) of the pipelines of a range extension system 100Q of the seventeenth embodiment of the invention. FIG. 20 shows a partial schematic diagram (2) of the pipelines of the range extension system 100Q of the seventeenth embodiment of the invention. For ease of explanation, the corresponding members and pipelines of the first fuel source are shown in FIG. 19, and the corresponding members and pipelines of the second fuel source are shown in FIG. 20, that is, the range extension assembly 60 in FIG. 19 and FIG. 20 is the same fuel cell.

Referring to FIG. 19 and FIG. 20, in the present embodiment, the range extension system 100Q includes the first fuel storage device 20, the first fuel source control device 30, the second fuel storage device 40, the second fuel source control device 50, the range extension assembly 60, the first humidifier 78, the second humidifier 79, the first fuel source auxiliary control device 91, the second fuel source auxiliary control device 92, the air compressor 71, the pressure regulating valve 72, the air dryer 73, the discharge valve 74, the multi-circuit protection valve 75, the fuel regulator 81, and the flow meter 82.

Referring to FIG. 19, in the range extension system 100Q of the present embodiment, the first fuel storage device 20 further includes the gas storage cylinder 23, and the multi-circuit protection valve 75 is further communicated between the air compressor 71 and the gas storage cylinder 23. The range extension system 100Q also includes the first fuel source auxiliary control device 91.

The multi-circuit protection valve 75 controls the gas storage cylinder 23 to be communicated with the first fuel source auxiliary control device 91 according to the pressure threshold value. Specifically, when the valve assembly 753 in the multi-circuit protection valve 75 corresponding to the gas storage cylinder 23 reaches the set opening pressure, the valve assembly 753 is opened, so that the first fuel source stored in the gas storage cylinder 23 may be delivered to the first fuel source auxiliary control device 91 via the multi-circuit protection valve 75. Moreover, when the first fuel source auxiliary control device 91 is actuated by an auxiliary action force, the auxiliary action force drives the first fuel source auxiliary control device 91, so that the first fuel input portion 61 directly receives the first fuel source from the gas storage cylinder 23. Specifically, the first fuel source auxiliary control device 91 has an action portion 911; for example, the action portion 911 is disposed at the operating position of a traffic work driver's seat (cockpit). Here, the action portion 911 may be, but not limited to, a hand lever, and may also be in the form of a button or a knob, and the action method thereof may be mechanical, electrical, magnetic, electromagnetic, hydraulic, or pneumatic.

When the user operates the first fuel source auxiliary control device 91, the action force (i.e., the auxiliary action force) drives the first fuel source auxiliary control device 91 to open the separation valve therein, so that the first fuel source of the gas storage cylinder 23 is delivered to the first fuel input portion 61 of the range extension assembly 60 via the first fuel source auxiliary control device 91. Accordingly, when the central control equipment of the transport detects that power is insufficient, the driver may quickly obtain the first fuel source from the gas storage cylinder 23 by operating the first fuel source auxiliary control device 91 and chemically react the first fuel source with the second fuel source in the range extension assembly 60 to supplement electric power. In addition, in the present embodiment, a check valve 93 may also be communicated between the gas storage cylinder 23 and the first fuel source auxiliary control device 91 to ensure the safety of fuel supply. In addition, the range extension system 100Q also includes the discharge valve 74 communicated between the gas storage cylinder 23 and the atmosphere to maintain the pressure in the gas storage cylinder 23.

It should be noted that, in other embodiments in which the range extension system includes the first fuel storage device 20, the first fuel source control device 30, and the range extension assembly 60, the first fuel source auxiliary control device 91 may also be disposed.

Similarly, referring to FIG. 20, in the present embodiment, the second fuel storage device 40 further includes a gas storage cylinder 43, and the range extension system 100Q further includes the second fuel source auxiliary control device 92.

The second fuel source auxiliary control device 92 is communicated with the gas storage cylinder 43, and when the second fuel source auxiliary control device 92 is actuated by an auxiliary action force, the auxiliary action force drives the second fuel source auxiliary control device 92, so that the second fuel input portion 62 receives the second fuel source from the gas storage cylinder 43. Specifically, the second fuel source auxiliary control device 92 has an action portion 921; for example, the action portion 921 is disposed at the operating position of a traffic work driver's seat (cockpit). Here, the action portion 921 may be, but not limited to, a hand lever, and may also be in the form of a button or a knob, and the action method thereof may be mechanical, electrical, magnetic, electromagnetic, hydraulic, or pneumatic.

When the user operates the second fuel source auxiliary control device 92, the action force (i.e., the auxiliary action force) drives the second fuel source auxiliary control device 92 to open the separation valve therein, so that the second fuel source of the gas storage cylinder 43 is delivered to the second fuel input portion 62 of the range extension assembly 60 via the second fuel source auxiliary control device 92. Accordingly, when the central control equipment of the transport detects that power is insufficient, the driver may quickly obtain the second fuel source from the gas storage cylinder 43 by operating the second fuel source auxiliary control device 92 and chemically react the second fuel source with the first fuel source in the range extension assembly 60 to supplement electric power.

It should be noted that, in other embodiments in which the range extension system includes the second fuel storage device 40, the second fuel source control device 50, and the range extension assembly 60, the second fuel source auxiliary control device 92 may also be disposed.

It should be noted that the action portion 911 of the first fuel source auxiliary control device 91 and the action portion 921 of the second fuel source auxiliary control device 92 may be integrated into the same assembly (e.g., but not limited to, a pull rod). Accordingly, the user operates the assembly to simultaneously drive the first fuel source auxiliary control device 91 and the second fuel source auxiliary control device 92. Therefore, the first fuel source and the second fuel source may be directly delivered from the gas storage cylinder 23 and the gas storage cylinder 43 to the range extension assembly 60 in one operation.

Referring to FIG. 19, in the present embodiment, the range extension system 100Q further includes the first pressure balance valve 76. The first pressure balance valve 76 may be disposed under the chassis of the transport, actuated with the load of the transport, and communicated between the gas storage cylinder 21 and the first fuel input portion 61 of the range extension assembly 60.

Accordingly, as the load of the transport is increased, the first pressure balance valve 76 may be driven to open, so that the gas storage cylinder 21 is also delivered to the first fuel input portion 61 of the range extension assembly 60 via the pipelines in the first pressure balance valve 76, thus increasing the power output of the range extension assembly 60. In addition, the first pressure balance valve 76 is also communicated with the first output end 312. Accordingly, the first fuel source output from the first output end 312 may re-enter the first pressure balance valve 76, and when the load of the transport is higher, the load further drives the first pressure balance valve 76 so that the first fuel source is delivered to the first fuel input portion 61 of the range extension assembly 60, as shown in FIG. 19.

It should be noted that, in other embodiments in which the range extension system includes the first fuel storage device 20, the first fuel source control device 30, and the range extension assembly 60, the first pressure balance valve 76 may also be disposed.

Similarly, referring to FIG. 20, in the present embodiment, the range extension system 100Q further includes the second pressure balance valve 77. The second pressure balance valve 77 may be disposed under the chassis of the transport, actuated with the load of the transport to increase or decrease the air supply and air pressure provided thereby, and communicated between the gas storage cylinder 41 and the second fuel input portion 62 of the range extension assembly 60.

Accordingly, as the load of the transport is increased, the second pressure balance valve 77 may be driven to open, so that the second fuel source in the gas storage cylinder 41 is also delivered to the second fuel input portion 62 of the range extension assembly 60 via the pipelines in the second pressure balance valve 77, thus increasing the power output of the range extension assembly 60. In addition, the second pressure balance valve 77 is also communicated with the third output end 512. Accordingly, the second fuel source output from the third output end 512 may re-enter the second pressure balance valve 77, and when the load of the transport is higher, the load further drives the second pressure balance valve 77 so that the second fuel source is delivered to the second fuel input portion 62 of the range extension assembly 60, as shown in FIG. 20.

It should be noted that, in other embodiments in which the range extension system includes the second fuel storage device 40, the second fuel source control device 50, and the range extension assembly 60, the second pressure balance valve 77 may also be disposed.

Referring to FIG. 19, the air compressor 71 is communicated with the first fuel storage device 20. The air compressor 71 is further connected to the atmosphere and configured to compress air into the first fuel source. It should be noted that, in other embodiments in which the range extension system includes the first fuel storage device 20, the air compressor 71 may also be disposed. Referring to FIG. 19, the pressure regulating valve 72 is disposed between the air compressor 71 and the first fuel storage device 20 and may be configured to adjust the pressure of the first fuel source. In this way, overburden of the pipelines connected between the assemblies causing rupture of the pipelines and resulting in the danger of leakage of the gas source may be avoided. It should be noted that, in other embodiments in which the range extension system includes the first fuel storage device 20, the pressure regulating valve 72 may also be disposed.

Referring to FIG. 19, the air dryer 73 is communicated between the air compressor 71 and the first fuel source control device 30, and may be configured to remove moisture in the compressed air compressed by the air compressor 71. It should be noted that, in the present embodiment, the first fuel storage device 20 may further include the gas storage cylinder 24 to dry the damp air dryer 73, and the air dryer 73 is communicated between the gas storage cylinder 24 and the first fuel source control device 30. It should be noted that, in other embodiments in which the range extension system includes the first fuel storage device 20, the air dryer 73 and the gas storage cylinder 24 may also be disposed.

Referring to FIG. 19, each of the discharge valves 74 is communicated with the atmosphere and the gas storage cylinders 21 and 22. Thereby, the condensed water in the gas storage cylinders 21 and 22 may be discharged to the atmosphere via the discharge valves 74, and the pressure of the gas storage cylinders 21 and 22 may be maintained. It should be noted that, in other embodiments in which the range extension system includes the first fuel storage device 20, the discharge valve 74 may also be disposed.

Referring to FIG. 19, the multi-circuit protection valve 75 is communicated between the air compressor 71 and the gas storage cylinders 21 and 22, and the multi-circuit protection valve 75 controls the gas storage cylinder 21 to communicate with the first action unit 31 via the first input end 311 according to the pressure threshold value, and controls the gas storage cylinder 22 to communicate with the second action unit 32 via the second input end 321 according to the pressure threshold value. It should be noted that, in other embodiments in which the range extension system includes the first fuel storage device 20 and the first fuel source control device 30, the multi-circuit protection valve 75 may also be disposed.

In some embodiments, the valve assembly 754 of the multi-circuit protection valve 75 is also connected to the gas storage cylinder 25, so as to provide gas source to the air brake or air suspension system, so as to control the air brake or air suspension system.

As shown in FIG. 20, the fuel regulator 81 and the flow meter 82 are communicated between the gas storage cylinders 41 and 42 of the second fuel storage device 40 and the second fuel source control device 50. Further, the fuel regulator 81 includes a screening program, a pressure regulator, and a lubricator. Therefore, before the gas stored in the gas storage cylinders 41 and 42 is provided to the range extension assembly 60 for use, air impurities and moisture are filtered via the screening program, and then the pressure is controlled by the pressure regulator. The flow meter 82 is configured to measure the flow of the fuel source passing through the segment pipeline. It should be noted that, in other embodiments in which the range extension system includes the second fuel storage device 40, the fuel regulator 81 and the flow meter 82 may also be disposed.

In some embodiments, the range extension system includes the first fuel storage device 20, the second fuel storage device 40, the range extension assembly 60, and the blower 95. The connection relationship between the components and the functions of the components are described above, and are not repeated herein.

In some embodiments, the range extension system includes the first fuel storage device 20, the second fuel storage device 40, the range extension assembly 60, the first humidifier 78, the second humidifier 79, and the blower 95. The connection relationship between the components and the functions of the components are described above, and are not repeated herein.

In some embodiments, the range extension system includes the first fuel storage device 20, the first fuel source control device 30, the second fuel storage device 40, the second fuel source control device 50, the range extension assembly 60, and the blower 95. The connection relationship between the components and the functions of the components are described above, and are not repeated herein.

In some embodiments, the range extension system includes the first fuel storage device 20, the first fuel source control device 30, the second fuel storage device 40, the second fuel source control device 50, the range extension assembly 60, the first humidifier 78, the second humidifier 79, and the blower 95. The connection relationship between the components and the functions of the components are described above, and are not repeated herein.

In an embodiment, the range extension system includes the first fuel storage device 20, the first fuel source control device 30, the second fuel storage device 40, the second fuel source control device 50, the range extension assembly 60, the first humidifier 78, the second humidifier 79, the first fuel auxiliary control device 91, the second fuel auxiliary control device 92, and the blower 95. The connection relationship between the components and the functions of the components are described above, and are not repeated herein.

In an embodiment, the range extension system includes the first fuel storage device 20, the first fuel source control device 30, the second fuel storage device 40, the second fuel source control device 50, the range extension assembly 60, the first humidifier 78, the second humidifier 79, the first fuel auxiliary control device 91, the second fuel auxiliary control device 92, the first pressure balance valve 76, the second pressure balance valve 77, and the blower 95. The connection relationship between the components and the functions of the components are described above, and are not repeated herein.

In an embodiment, the range extension system includes the first fuel storage device 20, the first fuel source control device 30, the second fuel storage device 40, the second fuel source control device 50, the range extension assembly 60, the first humidifier 78, the second humidifier 79, the first fuel source auxiliary control device 91, the second fuel source auxiliary control device 92, the air compressor 71, the pressure regulating valve 72, the air dryer 73, the discharge valve 74, the multi-circuit protection valve 75, the fuel regulator 81, the flow meter 82, the blower controller 96, and the blower 95. The connection relationship between the components and the functions of the components are described above, and are not repeated herein.

It should be mentioned that, in the above embodiments, when the range extension system includes only one of the first fuel source control device 30 or the second fuel source control device 50, the range extension system may also be disposed with only the first humidifier 78 or the second humidifier 79, which is not repeated herein.

It should also be mentioned that, the first fuel source control device 30, the first fuel source auxiliary control device 91, the first pressure balance valve 76, the second fuel source control device 50, the second fuel source auxiliary control device 92, the second pressure balance valve 77, and the blower 95 may all be controlled and operated by adopting an electromagnetic, pneumatic, hydraulic, mechanical, electrical, or magnetic method, artificial intelligence control, computer integrated circuit, or ECU (electronic control unit).

In an embodiment, at least one of the first fuel source control device 30 and the second fuel source control device 50 is an electromagnetic control device.

In an embodiment, the first fuel source control device 30, the first pressure balance valve 76, the first fuel source auxiliary control device 91, the second fuel source control device 50, the second pressure balance valve 77, and the second fuel source auxiliary control device 92 are mechanically controlled, electromagnetically controlled, hydraulically controlled, or pneumatically controlled.

In summary, the range extension systems 100A to 100Q of one or a plurality of embodiments of the invention may receive the first fuel source and the second fuel source via the first fuel input portion 61 and the second fuel input portion 62, respectively. In turn, the first fuel source and the second fuel source are mixed in the range extension assembly 60 to generate electrical output. In addition, in some embodiments, the first fuel storage device 20 and the second fuel storage device 30 may be used as supply sources of the first fuel source and the second fuel source, respectively. In some embodiments, the first fuel source control device 40 and/or the second fuel source control device 50 may suitably adjust the supply amount of the fuel source in real time according to different driving conditions of the user. In some embodiments, fuel may also be provided directly and continuously from the gas storage cylinders to the range extension assembly 60 via the first fuel source auxiliary control device 91 and/or the second fuel source auxiliary control device 92 when the user determines via the central control unit that power is insufficient and fuel needs to be provided. In some embodiments, when the load of the transport is higher, the gas storage cylinders may additionally add fuel to the range extension assembly 60 via the first pressure balance valve 76 and/or the second pressure balance valve

77, thereby increasing the power output of the range extension assembly 60. In some embodiments, the first fuel source may be provided by being configured with the blower 95; alternatively, the first fuel source may be selectively obtained from one of the blower 95 and the first fuel storage device 20 configured.

Of course, the invention may also have other various embodiments. Without departing from the spirit and essence of the invention, those skilled in the art may make various corresponding changes and modifications according to the invention. However, these corresponding changes and deformations should all belong to the scope of the claims of the invention.

What is claimed is:

1. A range extension system, comprising:
   a range extension assembly having a first fuel input portion and a second fuel input portion, wherein the first fuel input portion is configured to receive a first fuel source, the second fuel input portion is configured to receive a second fuel source different from the first fuel source, and the second fuel source and the first fuel source are reacted with each other in the range extension assembly to generate an electrical output;
   a fuel supply unit including gas storage cylinder or a blower, configured to provide the first fuel source to the first fuel input portion; a second fuel storage device including gas storage cylinder, wherein the second fuel storage device is configured to store and provide the second fuel source to the second fuel input portion; and
   a second fuel source control device is connected to the second fuel storage device, wherein the second fuel source control device comprises:
   a third action unit including a foot pedal, having a third input end and a third output end, wherein the third action unit is communicated with the second fuel storage device via the third input end to receive the second fuel source; and
   a fourth action unit including a separation valve, detachably connected to the third action unit and actuated by the third action unit, wherein the fourth action unit has a fourth input end and a fourth output end, and the fourth action unit is communicated with the second fuel storage device via the fourth input end to receive the second fuel source;
   wherein in the second fuel source control device, when the third action unit is actuated by a second action force, the third action unit generates a second action stroke, and in a case that the second action stroke is less than a second threshold value, the second action force drives the third action unit, so that the second fuel input portion receives the second fuel source from the second fuel source control device via the third output end; and in a case that the second action stroke is greater than or equal to the second threshold value, the second action force drives the third action unit to connect and propel the fourth action unit, so that the second fuel input portion receives the second fuel source from the second fuel source control device via the third output end and the fourth output end.

2. The range extension system of claim 1, wherein the fuel supply unit comprises a first fuel storage device including gas storage cylinder or a blower, and the first fuel storage device is configured to store and provide the first fuel source to the first fuel input portion.

3. The range extension system of claim 2, further comprising a first humidifier and a second humidifier, wherein the first humidifier is communicated between the first fuel storage device and the first fuel input portion, and the second humidifier is communicated between the second fuel storage device and the second fuel input portion.

4. The range extension system of claim 2, further comprising a first fuel source control device, the first fuel source control device is connected to the first fuel storage device, wherein the first fuel source control device comprises:

a first action unit including a foot pedal, having a first input end and a first output end, wherein the first action unit receives the first fuel source via the first input end; and a second action unit including a separation valve, detachably connected to the first action unit and actuated by the first action unit, wherein the second action unit has a second input end and a second output end, and the second action unit receives the first fuel source via the second input end;

wherein in the first fuel source control device, when the first action unit is actuated by a first action force, the first action unit generates a first action stroke, and in a case that the first action stroke is less than a first threshold value, the first action force drives the first action unit, so that the first fuel input portion receives the first fuel source from the first fuel source control device via the first output end; and in a case that the first action stroke is greater than or equal to the first threshold value, the first action force drives the first action unit to act in conjunction with the second action unit, so that the first fuel input portion receives the first fuel source from the first fuel source control device via the first output end and the second output end.

5. The range extension system of claim 4, further comprising a first humidifier and a second humidifier, wherein the first humidifier is communicated between the first fuel storage device and the first fuel input portion, and the second humidifier is communicated between the second fuel storage device and the second fuel input portion.

6. The range extension system of claim 5, further comprising a first fuel source auxiliary control device including a hand lever, a button, or a knob and a second fuel source auxiliary control device including a hand lever, a button, or a knob, wherein the first fuel source auxiliary control device is communicated with the first fuel storage device, and when the first fuel source auxiliary control device is actuated by a first auxiliary action force, the first auxiliary action force drives the first fuel source auxiliary control device, so that the first fuel input portion receives the first fuel source from the first fuel storage device; the second fuel source auxiliary control device is communicated with the second fuel storage device, and when the second fuel source auxiliary control device is actuated by a second auxiliary action force, the second auxiliary action force drives the second fuel source auxiliary control device, so that the second fuel input portion receives the second fuel source from the second fuel storage device.

7. The range extension system of claim 6, further comprising a first pressure balance valve and a second pressure balance valve, wherein the first pressure balance valve is communicated between the first fuel storage device and the first fuel input portion, and the second pressure balance valve is communicated between the second fuel storage device and the second fuel input portion.

8. The range extension system of claim 7, further comprising an air compressor, a pressure regulating valve, an air dryer, a multi-circuit protection valve, a discharge valve, a fuel regulator, and a flow meter, wherein the first fuel storage device further comprises a first gas storage cylinder, a second gas storage cylinder, and a first auxiliary gas storage cylinder, the second fuel storage device further comprises a third gas storage cylinder, a fourth gas storage cylinder, and a second auxiliary gas storage cylinder; the air compressor is communicated with the first fuel storage device, and the air compressor is further communicated with an atmosphere to compress an air into the first fuel source; the pressure regulating valve and the air dryer are disposed between the air compressor and the first fuel storage device; the multi-circuit protection valve is communicated between the air compressor and the first gas storage cylinder, the second gas storage cylinder, and the first auxiliary gas storage cylinder; the discharge valve is communicated with the atmosphere and the first gas storage cylinder; the fuel regulator and the flow meter are communicated between the second fuel storage device and the second fuel source control device; the multi-circuit protection valve controls the first gas storage cylinder to be communicated with the first action unit via the first input end according to a pressure threshold value, the multi-circuit protection valve controls the second gas storage cylinder to be communicated with the second action unit via the second input end according to the pressure threshold value, and the multi-circuit protection valve controls the first auxiliary gas storage cylinder to be communicated with the first fuel source auxiliary control device according to the pressure threshold value; when the first fuel source auxiliary control device is actuated by the first auxiliary action force, the first auxiliary action force drives the first fuel source auxiliary control device, so that the first fuel input portion receives the first fuel source from the first auxiliary gas storage cylinder; the third gas storage cylinder is communicated with the third action unit via the third input end, the fourth gas storage cylinder is communicated with the fourth action unit via the fourth input end, and the second fuel source auxiliary control device is communicated with the second auxiliary gas storage cylinder; when the second fuel source auxiliary control device is actuated by the second auxiliary action force, the second auxiliary action force drives the second fuel source auxiliary control device, so that the second fuel input portion receives the second fuel source from the second auxiliary gas storage cylinder.

9. The range extension system of claim 7, wherein the first fuel source control device, the first pressure balance valve, the first fuel source auxiliary control device, the second fuel source control device, the second pressure balance valve, and the second fuel source auxiliary control device are mechanically controlled, electromagnetically controlled, hydraulically controlled, or pneumatically controlled.

10. The range extension system of claim 4, further comprising a humidifier communicated between the second fuel storage device and the second fuel input portion.

11. The range extension system of claim 10, further comprising a first fuel source auxiliary control device including a hand lever, a button, or a knob and a second fuel source auxiliary control device including a hand lever, a button, or a knob; the first fuel source auxiliary control device is communicated with the first fuel storage device, and when the first fuel source auxiliary control device is actuated by a first auxiliary action force, the first auxiliary action force drives the first fuel source auxiliary control device, so that the first fuel input portion receives the first fuel source from the first fuel storage device; the second fuel source auxiliary control device is communicated with the second fuel storage device, and when the second fuel source auxiliary control device is actuated by a second auxiliary action force, the second auxiliary action force drives the second fuel source auxiliary control device, so that the second fuel input portion receives the second fuel source from the second fuel storage device.

12. The range extension system of claim 11, further comprising a first pressure balance valve and a second pressure balance valve, wherein the first pressure balance valve is communicated between the first fuel storage device and the first fuel input portion, and the second pressure balance valve is communicated between the second fuel storage device and the second fuel input portion.

13. The range extension system of claim 12, further comprising an air compressor, a pressure regulating valve, an air dryer, a multi-circuit protection valve, a discharge valve, a fuel regulator, and a flow meter, wherein the first fuel storage device further comprises a first gas storage cylinder, a second gas storage cylinder, and a first auxiliary gas storage cylinder, the second fuel storage device further comprises a third gas storage cylinder, a fourth gas storage cylinder, and a second auxiliary gas storage cylinder; the air compressor is communicated with the first fuel storage device, and the air compressor is further communicated with an atmosphere to compress an air into the first fuel source; the pressure regulating valve and the air dryer are disposed between the air compressor and the first fuel storage device; the multi-circuit protection valve is communicated between the air compressor and the first gas storage cylinder, the second gas storage cylinder, and the first auxiliary gas storage cylinder; the discharge valve is communicated with the atmosphere and the first gas storage cylinder; the fuel regulator and the flow meter are communicated between the second fuel storage device and the second fuel source control device; the multi-circuit protection valve controls the first gas storage cylinder to be communicated with the first action unit via the first input end according to a pressure threshold value, the multi-circuit protection valve controls the second gas storage cylinder to be communicated with the second action unit via the second input end according to the pressure threshold value, and the multi-circuit protection valve controls the first auxiliary gas storage cylinder to be communicated with the first fuel source auxiliary control device according to the pressure threshold value; when the first fuel source auxiliary control device is actuated by the first auxiliary action force, the first auxiliary action force drives the first fuel source auxiliary control device, so that the first fuel input portion receives the first fuel source from the first auxiliary gas storage cylinder; the third gas storage cylinder is communicated with the third action unit via the third input end, the fourth gas storage cylinder is communicated with the fourth action unit via the fourth input end, and the second fuel source auxiliary control device is communicated with the second auxiliary gas storage cylinder; when the second fuel source auxiliary control device is actuated by the second auxiliary action force, the second auxiliary action force drives the second fuel source auxiliary control device, so that the second fuel input portion receives the second fuel source from the second auxiliary gas storage cylinder.

14. The range extension system of claim 11, further comprising a first pressure balance valve, wherein the first pressure balance valve is communicated between the first fuel storage device and the first fuel input portion.

15. The range extension system of claim 11, further comprising a second pressure balance valve, wherein the second pressure balance valve is communicated between the second fuel storage device and the second fuel input portion.

16. The range extension system of claim 10, further comprising a first fuel source auxiliary control device including a hand lever, a button, or a knob, wherein the first fuel source auxiliary control device is communicated with the first fuel storage device, and when the first fuel source auxiliary control device is actuated by a first auxiliary action force, the first auxiliary action force drives the first fuel source auxiliary control device, so that the first fuel input portion receives the first fuel source from the first fuel storage device.

17. The range extension system of claim 10, further comprising a second fuel source auxiliary control device including a hand lever, a button, or a knob, wherein the second fuel source auxiliary control device is communicated with the second fuel storage device, and when the second fuel source auxiliary control device is actuated by a second auxiliary action force, the second auxiliary action force drives the second fuel source auxiliary control device, so that the second fuel input portion receives the second fuel source from the second fuel storage device.

18. The range extension system of claim 2, further comprising a first fuel source control device, wherein the first fuel source control device is connected to the first fuel storage device, and the first fuel source control device comprises:

a first action unit including a foot pedal, having a first input end and a first output end, wherein the first action unit receives the first fuel source via the first input end; and a second action unit including a separation valve, detachably connected to the first action unit and actuated by the first action unit, wherein the second action unit has a second input end and a second output end, and the second action unit receives the first fuel source via the second input end;

wherein in the first fuel source control device, when the first action unit is actuated by a first action force, the first action unit generates a first action stroke, and in a case that the first action stroke is less than a first threshold value, the first action force drives the first action unit, so that the first fuel input portion receives the first fuel source from the first fuel source control device via the first output end; and in a case that the first action stroke is greater than or equal to the first threshold value, the first action force drives the first action unit to act in conjunction with the second action unit, so that the first fuel input portion receives the first fuel source from the first fuel source control device via the first output end and the second output end.

19. The range extension system of claim 18, further comprising a first fuel source auxiliary control device including a hand lever, a button, or a knob, wherein the first fuel source auxiliary control device is communicated with the first fuel storage device, and when the first fuel source auxiliary control device is actuated by a first auxiliary action force, the first auxiliary action force drives the first fuel source auxiliary control device, so that the first fuel input portion receives the first fuel source from the first fuel storage device.

20. The range extension system of claim 19, further comprising a first pressure balance valve, wherein the first pressure balance valve is communicated between the first fuel storage device and the first fuel input portion.

21. The range extension system of claim 2, further comprising a humidifier communicated between the second fuel storage device and the second fuel input portion.

22. The range extension system of claim 1, further comprising a second fuel source auxiliary control device including a hand lever, a button, or a knob, wherein the second fuel source auxiliary control device is communicated with the second fuel storage device, and when the second fuel source auxiliary control device is actuated by a second auxiliary action force, the second auxiliary action force drives the second fuel source auxiliary control device, so that the second fuel input portion receives the second fuel source from the second fuel storage device.

23. The range extension system of claim 22, further comprising a second pressure balance valve, wherein the second pressure balance valve is communicated between the second fuel storage device and the second fuel input portion.

24. The range extension system of claim 1, wherein the fuel supply unit comprises a blower configured to provide a first fuel source to the first fuel input portion.

25. The range extension system of claim 24, further comprising a first humidifier and a second humidifier, wherein the first humidifier is communicated between the blower and the first fuel input portion, and the second humidifier is communicated between the second fuel storage device and the second fuel input portion.

26. The range extension system of claim 24, further comprising a first fuel source control device, the first fuel source control device is connected to the blower, wherein the first fuel source control device comprises:

a first action unit including a foot pedal, having a first input end and a first output end, wherein the first action unit receives the first fuel source via the first input end; and a second action unit including a separation valve, detachably connected to the first action unit and actuated by the first action unit, wherein the second action unit has a second input end and a second output end, and the second action unit receives the first fuel source via the second input end;

wherein in the first fuel source control device, when the first action unit is actuated by a first action force, the first action unit generates a first action stroke, and in a case that the first action stroke is less than a first threshold value, the first action force drives the first action unit, so that the first fuel input portion receives the first fuel source from the first fuel source control device via the first output end; and in a case that the first action stroke is greater than or equal to the first threshold value, the first action force drives the first action unit to act in conjunction with the second action unit, so that the first fuel input portion receives the first fuel source from the first fuel source control device via the first output end and the second output end.

27. The range extension system of claim 26, further comprising a first humidifier and a second humidifier, wherein the first humidifier is communicated between the blower and the first fuel input portion, and the second humidifier is communicated between the second fuel storage device and the second fuel input portion.

28. The range extension system of claim 26, further comprising a first fuel source auxiliary control device including a hand lever, a button, or a knob and a second fuel source auxiliary control device including a hand lever, a button, or a knob; the first fuel source auxiliary control device is communicated with the blower, and when the first fuel source auxiliary control device is actuated by a first auxiliary action force, the first auxiliary action force drives the first fuel source auxiliary control device, so that the first fuel input portion receives the first fuel source from the blower; the second fuel source auxiliary control device is communicated with the second fuel storage device, and when the second fuel source auxiliary control device is actuated by a second auxiliary action force, the second auxiliary action force drives the second fuel source auxiliary control device, so that the second fuel input portion receives the second fuel source from the second fuel storage device.

29. The range extension system of claim 28, further comprising a first humidifier and a second humidifier, wherein the first humidifier is communicated between the blower and the first fuel input portion, and the second humidifier is communicated between the second fuel storage device and the second fuel input portion.

30. The range extension system of claim 28, further comprising a first pressure balance valve and a second pressure balance valve, wherein the first pressure balance valve is communicated between the blower and the first fuel input portion, and the second pressure balance valve is communicated between the second fuel storage device and the second fuel input portion.

31. The range extension system of claim 30, further comprising a first humidifier and a second humidifier, wherein the first humidifier is communicated between the blower and the first fuel input portion, and the second humidifier is communicated between the second fuel storage device and the second fuel input portion.

32. The range extension system of claim 30, further comprising an air compressor, a pressure regulating valve, an air dryer, a multi-circuit protection valve, a discharge valve, a fuel regulator, and a flow meter, wherein the first fuel storage device further comprises a first gas storage cylinder, a second gas storage cylinder, and a first auxiliary gas storage cylinder, the second fuel storage device further comprises a third gas storage cylinder, a fourth gas storage cylinder, and a second auxiliary gas storage cylinder; the air compressor is communicated with the first fuel storage device, and the air compressor is further communicated with an atmosphere to compress an air into the first fuel source; the pressure regulating valve and the air dryer are disposed between the air compressor and the first fuel storage device; the multi-circuit protection valve is communicated between the air compressor and the first gas storage cylinder, the second gas storage cylinder, and the first auxiliary gas storage cylinder; the discharge valve is communicated with the atmosphere and the first gas storage cylinder; the fuel regulator and the flow meter are communicated between the second fuel storage device and the second fuel source control device; the multi-circuit protection valve controls the first gas storage cylinder to be communicated with the first action unit via the first input end according to a pressure threshold value, the multi-circuit protection valve controls the second gas storage cylinder to be communicated with the second action unit via the second input end according to the pressure threshold value, and the multi-circuit protection valve controls the first auxiliary gas storage cylinder to be communicated with the first fuel source auxiliary control device according to the pressure threshold value; when the first fuel source auxiliary control device is actuated by the first auxiliary action force, the first auxiliary action force drives the first fuel source auxiliary control device, so that the first fuel input portion receives the first fuel source from the first auxiliary gas storage cylinder; the third gas storage cylinder is communicated with the third action unit via the third input end, the fourth gas storage cylinder is communicated with the fourth action unit via the fourth input end, and the second fuel source auxiliary control device is communicated with the second auxiliary gas storage cylinder; when the second fuel source auxiliary control device is actuated by the second auxiliary action force, the second auxiliary action force drives the second fuel source auxiliary control device, so that the second fuel input portion receives the second fuel source from the second auxiliary gas storage cylinder.

33. The range extension system of claim 24, further comprising a first fuel source control device, wherein the first fuel source control device is connected to the blower, and the first fuel source control device comprises:

a first action unit including a foot pedal, having a first input end and a first output end, wherein the first action unit receives the first fuel source via the first input end; and a second action unit including a separation valve, detachably connected to the first action unit and actuated by the first action unit, wherein the second action unit has a second input end and a second output end, and the second action unit receives the first fuel source via the second input end;

wherein in the first fuel source control device, when the first action unit is actuated by a first action force, the first action unit generates a first action stroke, and in a case that the first action stroke is less than a first threshold value, the first action force drives the first action unit, so that the first fuel input portion receives the first fuel source from the first fuel source control device via the first output end; and in a case that the first action stroke is greater than or equal to the first threshold value, the first action force drives the first action unit to act in conjunction with the second action unit, so that the first fuel input portion receives the first fuel source from the first fuel source control device via the first output end and the second output end.

34. The range extension system of claim 33, further comprising a first fuel source auxiliary control device including a hand lever, a button, or a knob, wherein the first fuel source auxiliary control device is communicated with the blower, and when the first fuel source auxiliary control device is actuated by a first auxiliary action force, the first auxiliary action force drives the first fuel source auxiliary control device, so that the first fuel input portion receives the first fuel source from the blower.

35. The range extension system of claim 34, further comprising a first pressure balance valve, wherein the first pressure balance valve is communicated between the blower and the first fuel input portion.

36. The range extension system of claim 24, further comprising a second fuel source auxiliary control device including a hand lever, a button, or a knob, wherein the second fuel source auxiliary control device is communicated with the second fuel storage device, and when the second fuel source auxiliary control device is actuated by a second auxiliary action force, the second auxiliary action force drives the second fuel source auxiliary control device, so that the second fuel input portion receives the second fuel source from the second fuel storage device.

37. The range extension system of claim 36, further comprising a second pressure balance valve, wherein the second pressure balance valve is communicated between the second fuel storage device and the second fuel input portion.

38. The range extension system of claim 1, wherein the second fuel storage device comprises a plurality of gas storage cylinders that are high-pressure steel flasks for storing a high-pressure gas or a low-pressure hydrogen storage bottle for storing a low-pressure gas, the low-pressure hydrogen storage bottle adopts a hydrogen storage material of a metal oxide, a nanomaterial, a rare earth material, or a metal alloy, and stores hydrogen by adsorbing hydrogen on the material.

* * * * *